US009056244B2

(12) United States Patent
Lesley et al.

(10) Patent No.: US 9,056,244 B2
(45) Date of Patent: Jun. 16, 2015

(54) GAMING APPARATUS INCORPORATING TARGETED HAPTIC FEEDBACK

(71) Applicant: WMS Gaming Inc., Waukegan, IL (US)

(72) Inventors: Paul M. Lesley, Blue Island, IL (US); Timothy C. Loose, Chicago, IL (US); Scott A. Massing, Lincolnwood, IL (US); Jamie W. Vann, Chicago, IL (US)

(73) Assignee: WMS GAMING INC., Waukegan, IL (US)

( * ) Notice: Subject to any disclaimer, the term of this patent is extended or adjusted under 35 U.S.C. 154(b) by 32 days.

(21) Appl. No.: 13/785,589

(22) Filed: Mar. 5, 2013

(65) Prior Publication Data

US 2014/0073409 A1 Mar. 13, 2014

Related U.S. Application Data

(60) Provisional application No. 61/699,945, filed on Sep. 12, 2012.

(51) Int. Cl.

*A63F 13/10* (2006.01)
*A63F 13/20* (2014.01)
*G07F 17/32* (2006.01)
*G07F 17/34* (2006.01)

(52) U.S. Cl.

CPC ............ *A63F 13/06* (2013.01); *G07F 17/3209* (2013.01); *G07F 17/32* (2013.01); *G07F 17/34* (2013.01)

(58) Field of Classification Search

None

See application file for complete search history.

(56) References Cited

U.S. PATENT DOCUMENTS

| | | | | |
|---|---|---|---|---|
| 5,576,727 | A | 11/1996 | Rosenberg | |
| 5,691,898 | A | 11/1997 | Rosenberg | |
| 5,701,140 | A | 12/1997 | Rosenberg | |
| 5,721,566 | A | 2/1998 | Rosenberg | |
| 5,724,264 | A | 3/1998 | Rosenberg | |
| 5,729,221 | A * | 3/1998 | Krolopp et al. | 341/22 |
| 5,731,804 | A | 3/1998 | Rosenberg | |
| 5,734,373 | A | 3/1998 | Rosenberg | |
| 5,739,811 | A | 4/1998 | Rosenberg | |
| 5,767,839 | A | 6/1998 | Rosenberg | |
| 5,805,140 | A | 9/1998 | Rosenberg | |
| 5,825,308 | A | 10/1998 | Rosenberg | |
| 5,880,714 | A | 3/1999 | Rosenberg | |
| 5,907,487 | A | 5/1999 | Rosenberg | |
| 5,929,607 | A | 7/1999 | Rosenberg | |
| 5,929,846 | A | 7/1999 | Rosenberg | |
| 5,956,484 | A | 9/1999 | Rosenberg | |
| 5,959,613 | A | 9/1999 | Rosenberg | |
| 5,999,168 | A | 12/1999 | Rosenberg | |
| 6,015,473 | A | 1/2000 | Rosenberg | |

(Continued)

OTHER PUBLICATIONS

US 5,903,456, 05/1999, Schena (withdrawn)

*Primary Examiner* — Dmitry Suhol
*Assistant Examiner* — Jason Yen
(74) *Attorney, Agent, or Firm* — Nixon Peabody LLP

(57) ABSTRACT

A gaming apparatus includes a processor, a display device with a video display and a touchscreen, and a bezel adjacent to the display device which has regions capable of providing haptic feedback. The haptic feedback can be provided to a specific region of the bezel as well as a transparent overlay which is positioned over a button on the touchscreen. The apparatus may have sensors allowing for haptic feedback to be targeted based on data detected by the sensors. Additionally, virtual input buttons can be displayed and repositioned on the touchscreen in response to sensor data.

20 Claims, 14 Drawing Sheets

(56) References Cited

U.S. PATENT DOCUMENTS

| | | | |
|---|---|---|---|
| 6,028,593 | A | 2/2000 | Rosenberg |
| 6,046,727 | A | 4/2000 | Rosenberg |
| 6,050,718 | A | 4/2000 | Rosenberg et al. |
| 6,057,828 | A | 5/2000 | Rosenberg |
| 6,061,004 | A | 5/2000 | Rosenberg |
| 6,078,308 | A | 6/2000 | Rosenberg |
| 6,078,876 | A | 6/2000 | Rosenberg |
| 6,088,019 | A | 7/2000 | Rosenberg |
| 6,100,874 | A | 8/2000 | Schena |
| 6,101,530 | A | 8/2000 | Rosenberg |
| 6,125,337 | A | 9/2000 | Rosenberg |
| 6,125,385 | A | 9/2000 | Wies |
| 6,128,006 | A | 10/2000 | Rosenberg |
| 6,134,506 | A | 10/2000 | Rosenberg |
| 6,147,674 | A | 11/2000 | Rosenberg |
| 6,154,198 | A | 11/2000 | Rosenberg |
| 6,154,201 | A | 11/2000 | Levin |
| 6,161,126 | A | 12/2000 | Wies |
| 6,166,723 | A | 12/2000 | Schena |
| 6,169,540 | B1 | 1/2001 | Rosenberg |
| 6,184,868 | B1 | 2/2001 | Shahoian |
| 6,191,774 | B1 | 2/2001 | Schena |
| 6,201,533 | B1 | 3/2001 | Rosenberg |
| 6,211,861 | B1 | 4/2001 | Rosenberg |
| 6,219,032 | B1 | 4/2001 | Rosenberg |
| 6,219,033 | B1 | 4/2001 | Rosenberg |
| 6,232,891 | B1 | 5/2001 | Rosenberg |
| 6,243,078 | B1 | 6/2001 | Rosenberg |
| 6,246,390 | B1 | 6/2001 | Rosenberg |
| 6,252,583 | B1 | 6/2001 | Braun |
| 6,259,382 | B1 | 7/2001 | Rosenberg |
| 6,271,828 | B1 | 8/2001 | Rosenberg |
| 6,271,833 | B1 | 8/2001 | Rosenberg |
| 6,278,439 | B1 | 8/2001 | Rosenberg |
| 6,285,351 | B1 | 9/2001 | Chang |
| 6,292,170 | B1 | 9/2001 | Chang |
| 6,300,936 | B1 | 10/2001 | Braun |
| 6,300,937 | B1 | 10/2001 | Rosenberg |
| 6,317,116 | B1 | 11/2001 | Rosenberg |
| 6,342,880 | B2 | 1/2002 | Rosenberg |
| 6,343,349 | B1 | 1/2002 | Braun |
| 6,348,911 | B1 | 2/2002 | Rosenberg |
| 6,353,427 | B1 | 3/2002 | Rosenberg |
| 6,353,850 | B1 | 3/2002 | Wies |
| 6,366,272 | B1 | 4/2002 | Rosenberg |
| 6,366,273 | B1 | 4/2002 | Rosenberg |
| 6,389,302 | B1 | 5/2002 | Vance |
| 6,400,352 | B1 | 6/2002 | Bruneau |
| 6,411,276 | B1 | 6/2002 | Braun |
| 6,424,356 | B2 | 7/2002 | Chang |
| 6,429,846 | B2 | 8/2002 | Rosenberg |
| 6,437,771 | B1 | 8/2002 | Rosenberg |
| 6,448,977 | B1 | 9/2002 | Braun |
| 6,469,692 | B2 | 10/2002 | Rosenberg |
| 6,486,872 | B2 | 11/2002 | Rosenberg |
| 6,563,487 | B2 | 5/2003 | Martin |
| 6,580,417 | B2 | 6/2003 | Rosenberg |
| 6,636,161 | B2 | 10/2003 | Rosenberg |
| 6,636,197 | B1 | 10/2003 | Goldenberg |
| 6,639,581 | B1 | 10/2003 | Moore |
| 6,661,403 | B1 | 12/2003 | Rosenberg |
| 6,686,901 | B2 | 2/2004 | Rosenberg |
| 6,686,911 | B1 | 2/2004 | Levin |
| 6,693,626 | B1 | 2/2004 | Rosenberg |
| 6,697,043 | B1 | 2/2004 | Shahoian |
| 6,697,044 | B2 | 2/2004 | Shahoian |
| 6,697,048 | B2 | 2/2004 | Rosenberg |
| 6,697,086 | B2 | 2/2004 | Rosenberg |
| 6,697,748 | B1 | 2/2004 | Rosenberg |
| 6,704,001 | B1 | 3/2004 | Schena |
| 6,707,443 | B2 | 3/2004 | Bruneau |
| 6,710,518 | B2 | 3/2004 | Morton |
| 6,715,045 | B2 | 3/2004 | Braun |
| 6,717,573 | B1 | 4/2004 | Shahoian |
| 6,750,877 | B2 | 6/2004 | Rosenberg |
| 6,822,635 | B2 | 11/2004 | Shahoian |
| 6,850,222 | B1 | 2/2005 | Rosenberg |
| 6,859,819 | B1 | 2/2005 | Rosenberg |
| 6,911,901 | B2 | 6/2005 | Bown |
| 6,956,558 | B1 | 10/2005 | Rosenberg |
| 6,982,700 | B2 | 1/2006 | Rosenberg |
| 6,987,504 | B2 | 1/2006 | Rosenberg |
| 7,023,423 | B2 | 4/2006 | Rosenberg |
| 7,027,032 | B2 | 4/2006 | Rosenberg |
| 7,038,657 | B2 | 5/2006 | Rosenberg |
| 7,038,667 | B1 | 5/2006 | Vassallo |
| 7,039,866 | B1 | 5/2006 | Rosenberg |
| 7,054,775 | B2 | 5/2006 | Rosenberg |
| 7,061,467 | B2 | 6/2006 | Rosenberg |
| 7,091,948 | B2 | 8/2006 | Chang |
| 7,091,950 | B2 | 8/2006 | Rosenberg |
| 7,102,541 | B2 | 9/2006 | Rosenberg |
| 7,106,305 | B2 | 9/2006 | Rosenberg |
| 7,106,313 | B2 | 9/2006 | Schena |
| 7,113,166 | B1 | 9/2006 | Rosenberg |
| 7,129,824 | B2 | 10/2006 | Cranfill |
| 7,131,073 | B2 | 10/2006 | Rosenberg |
| 7,136,045 | B2 | 11/2006 | Rosenberg |
| 7,148,875 | B2 | 12/2006 | Rosenberg |
| 7,158,112 | B2 | 1/2007 | Rosenberg |
| 7,168,042 | B2 | 1/2007 | Braun |
| 7,193,607 | B2 | 3/2007 | Moore |
| 7,199,790 | B2 | 4/2007 | Rosenberg |
| 7,209,117 | B2 | 4/2007 | Rosenberg |
| 7,233,313 | B2 | 6/2007 | Levin |
| 7,236,157 | B2 | 6/2007 | Schena |
| 7,253,803 | B2 | 8/2007 | Schena |
| 7,265,750 | B2 | 9/2007 | Rosenberg |
| 7,283,123 | B2 | 10/2007 | Braun |
| 7,299,321 | B2 | 11/2007 | Braun et al. |
| 7,327,348 | B2 | 2/2008 | Goldenberg et al. |
| 7,423,631 | B2 | 9/2008 | Shahoian |
| 7,432,910 | B2 | 10/2008 | Shahoian |
| 7,439,951 | B2 | 10/2008 | Rosenberg et al. |
| 7,450,110 | B2 | 11/2008 | Rosenberg |
| 7,460,104 | B2 | 12/2008 | Rosenberg |
| 7,460,105 | B2 | 12/2008 | Rosenberg et al. |
| 7,489,309 | B2 | 2/2009 | Braun |
| 7,502,011 | B2 | 3/2009 | Braun et al. |
| RE40,808 | E | 6/2009 | Shahoian |
| 7,548,232 | B2 | 6/2009 | Shahoian |
| 7,561,141 | B2 | 7/2009 | Shahoian |
| 7,564,444 | B2 | 7/2009 | Rosenberg |
| 7,567,232 | B2 | 7/2009 | Rosenberg |
| 7,592,999 | B2 | 9/2009 | Rosenberg |
| 7,602,384 | B2 | 10/2009 | Rosenberg |
| 7,605,800 | B2 | 10/2009 | Rosenberg |
| 7,636,080 | B2 | 12/2009 | Rosenberg |
| 7,688,310 | B2 | 3/2010 | Rosenberg |
| 7,701,438 | B2 | 4/2010 | Chang |
| 7,710,399 | B2 | 5/2010 | Bruneau |
| 7,728,820 | B2 | 6/2010 | Rosenberg |
| 7,768,504 | B2 | 8/2010 | Rosenberg |
| 7,777,716 | B2 | 8/2010 | Rosenberg |
| 7,821,496 | B2 | 10/2010 | Rosenberg |
| 7,843,424 | B2 | 11/2010 | Rosenberg |
| 7,916,121 | B2 | 3/2011 | Braun |
| 7,944,433 | B2 | 5/2011 | Schena |
| 7,944,435 | B2 | 5/2011 | Rosenberg |
| 7,969,288 | B2 | 6/2011 | Braun |
| 7,978,183 | B2 | 7/2011 | Rosenberg |
| 7,978,186 | B2 | 7/2011 | Vassallo |
| 7,982,720 | B2 | 7/2011 | Rosenberg |
| 7,986,303 | B2 | 7/2011 | Braun |
| 8,020,095 | B2 | 9/2011 | Braun |
| 8,031,181 | B2 | 10/2011 | Rosenberg |
| 8,049,734 | B2 | 11/2011 | Rosenberg |
| 8,059,104 | B2 | 11/2011 | Shahoian |
| 8,059,105 | B2 | 11/2011 | Rosenberg |
| 8,063,892 | B2 | 11/2011 | Shahoian |
| 8,063,893 | B2 | 11/2011 | Rosenberg |
| 8,072,422 | B2 | 12/2011 | Rosenberg |
| 8,077,145 | B2 | 12/2011 | Rosenberg |
| 8,188,981 | B2 | 5/2012 | Shahoian |

(56) References Cited

U.S. PATENT DOCUMENTS

| | | | | |
|---|---|---|---|---|
| 8,188,989 | B2 | 5/2012 | Levin | |
| 2002/0025837 | A1 | 2/2002 | Levy | |
| 2002/0075225 | A1 | 6/2002 | Schena | |
| 2002/0084721 | A1 | 7/2002 | Walczak | |
| 2002/0138562 | A1 | 9/2002 | Wies | |
| 2003/0018403 | A1 | 1/2003 | Braun | |
| 2003/0030619 | A1 | 2/2003 | Martin | |
| 2003/0030621 | A1 | 2/2003 | Rosenberg | |
| 2003/0063064 | A1 | 4/2003 | Braun | |
| 2003/0174121 | A1 | 9/2003 | Poupyrev | |
| 2004/0110527 | A1 * | 6/2004 | Tierling et al. | 455/550.1 |
| 2004/0145563 | A9 | 7/2004 | Rosenberg | |
| 2006/0028428 | A1 | 2/2006 | Dai | |
| 2006/0030383 | A1 | 2/2006 | Rosenberg | |
| 2006/0050059 | A1 | 3/2006 | Satoh | |
| 2006/0052143 | A9 | 3/2006 | Tuovinen | |
| 2006/0097400 | A1 | 5/2006 | Cruz | |
| 2006/0267932 | A1 | 11/2006 | Rosenberg | |
| 2006/0267944 | A1 | 11/2006 | Rosenberg | |
| 2007/0013655 | A1 | 1/2007 | Rosenberg | |
| 2007/0040815 | A1 | 2/2007 | Rosenberg | |
| 2007/0083323 | A1 * | 4/2007 | Rosenberg | 701/200 |
| 2007/0139375 | A1 | 6/2007 | Rosenberg | |
| 2007/0298877 | A1 | 12/2007 | Rosenberg | |
| 2008/0055241 | A1 | 3/2008 | Goldenberg | |
| 2008/0100568 | A1 | 5/2008 | Koch | |
| 2008/0117166 | A1 | 5/2008 | Rosenberg | |
| 2008/0234044 | A1 * | 9/2008 | Aida | 463/37 |
| 2008/0316171 | A1 | 12/2008 | Shahoian | |
| 2009/0033624 | A1 | 2/2009 | Rosenberg | |
| 2009/0160770 | A1 | 6/2009 | Shahoian | |
| 2010/0090813 | A1 | 4/2010 | Je et al. | |
| 2010/0156818 | A1 | 6/2010 | Burrough et al. | |
| 2010/0160016 | A1 * | 6/2010 | Shimabukuro et al. | 463/16 |
| 2010/0182241 | A1 | 7/2010 | Rosenberg | |
| 2010/0201502 | A1 | 8/2010 | Chang et al. | |
| 2010/0207882 | A1 | 8/2010 | Bruneau | |
| 2010/0263219 | A1 * | 10/2010 | Kempker et al. | 30/337 |
| 2010/0271295 | A1 | 10/2010 | Braun | |
| 2010/0325931 | A1 | 12/2010 | Rosenberg | |
| 2011/0241852 | A1 | 10/2011 | Braun | |
| 2011/0306416 | A1 * | 12/2011 | Kelly et al. | 463/31 |
| 2012/0056806 | A1 | 3/2012 | Rosenberg | |
| 2012/0056839 | A1 | 3/2012 | Rosenberg | |
| 2012/0112999 | A1 | 5/2012 | Braun | |
| 2013/0016053 | A1 * | 1/2013 | Jung | 345/173 |
| 2013/0084980 | A1 * | 4/2013 | Hammontree et al. | 463/36 |

* cited by examiner

GAMING APPARATUS INCORPORATING TARGETED HAPTIC FEEDBACK

CLAIM OF PRIORITY AND CROSS-REFERENCE TO RELATED APPLICATION

This application claims the benefit of and priority to U.S. Provisional Patent Application No. 61/699,945, which was filed on Sep. 12, 2012, and is incorporated herein by reference in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming apparatus and methods and, more particularly, to wagering game systems providing haptic feedback to enhance the gaming experience.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

Some enhancements to improve the game play experience include the addition of haptic feedback to provide an additional form of sensory involvement to the gaming experience. However, many gaming machines use at least one touchscreen to provide some gameplay capabilities, creating particular challenges when considering haptic feedback capability, as it may be undesirable or impossible to provide haptic feedback via the touchscreen. For example, it may be difficult or impossible to vibrate a touchscreen at a high frequency, especially when the touchscreen is large. Additionally, the haptic feedback may not be experienced by the player unless the player is in constant contact with the touchscreen. Therefore, it is highly desirable to enhance the gaming experience by developing a system capable of providing haptic feedback to gaming systems incorporating a touchscreen, without using the touchscreen itself to provide the feedback. Furthermore, it is desirable to have the capability to target the haptic feedback based on the player's positioning in relation to the gaming machine. Aspects of the present disclosure fulfill these and other desires.

SUMMARY OF THE INVENTION

According to an aspect of the present invention, a gaming system comprises a display device including a video display and touchscreen, a bezel adjacent to the display device incorporating one or more haptic feedback devices, a processor, and instructions stored in memory and executed by a processor causing the gaming system to display a wagering game on the video display, activate a haptic feedback device and perform a game action related to the wagering game.

According to another aspect of the invention, at least one haptic feedback device is disposed in a corner of the bezel proximate to a player using the gaming device.

According to another aspect of the invention, the bezel includes a first pair of corners adjacent to a player using the gaming apparatus and a second pair of corners farther away from the player than the first pair of corners. A first haptic feedback device is disposed in one of the first pair of corners, and a second haptic feedback device is disposed in the other of the first pair of corners.

According to another aspect of the invention, at least one haptic feedback device, when actuated, provides haptic feedback to a discrete region of the bezel, and that discrete region of the bezel receiving the haptic feedback comprises less than 10% of the total surface area of the bezel.

According to another aspect of the invention, a virtual input button of a wagering game is displayed on the video display at a position adjacent to a region of the bezel incorporating a first haptic feedback device. In response to actuation of the virtual input button via the touchscreen, the first haptic feedback device is activated and a game action associated with the virtual input button is performed.

According to another aspect of the invention, the region of the bezel incorporating a first haptic feedback device is configured to be in contact with a player when the player actuates the virtual input button.

According to another aspect of the invention, virtual reels of the wagering game are displayed on the video display, the virtual input button is a spin button, and the game action associated with the virtual input button is a spin of at least one virtual reel.

According to another aspect of the invention, the game action includes initiating play of the wagering game or accepting a wager to play the wagering game.

According to another aspect of the invention, the bezel incorporates a plurality of sensors and the plurality of haptic feedback devices, and each of the sensors is associated with a respective haptic feedback device, and the instructions cause the gaming apparatus to selectively activate the plurality of haptic feedback devices based on input received from the plurality of sensors.

According to another aspect of the invention, the gaming apparatus is a handheld device.

According to another aspect of the invention, a virtual input button of a wagering game is displayed on the video display at a position adjacent to a region of the bezel incorporating a first haptic feedback device. When a sensor input indicates a body in contact with another region of the bezel, the gaming apparatus is configured to reposition the virtual input button from its original position to a new position adjacent to the region of the bezel indicated by the sensor input.

According to another aspect of the invention, the display device is inclined at an angle of approximately 15 degrees relative to horizontal, the bezel includes a first pair of corners adjacent to a player using the gaming apparatus, at least one haptic feedback device is disposed in one corner of the first pair of corners, and at least another haptic feedback device is disposed in the other corner of the first pair of corners. Additionally, the gaming apparatus is configured such that the player's hands rest on the first pair of corners at the player's option while the player is playing the wagering game.

According to another aspect of the invention, the display device has an area of at least 40 square inches.

According to another aspect of the invention, a transparent overlay covering a portion of the display device is coupled to the bezel. Furthermore, at least one haptic feedback device, when actuated, provides haptic feedback via the transparent overlay.

According to another aspect of the invention, the bezel is at least partially constructed from a high durometer thermoplastic elastomer.

According to another aspect of the invention, at least one haptic feedback device, when actuated, causes the bezel to vibrate, and the display device is separated from the bezel such that, when a haptic feedback device is actuated, the display device does not vibrate.

According to another aspect of the invention, the wagering game system includes a display device and a bezel adjacent to the display device incorporating haptic feedback devices. Additionally, the system is configured to display a wagering game via the display device, activate at least one haptic feedback device to impart haptic feedback to a portion of the bezel; and perform a game action related to the wagering game.

According to another aspect of the invention, the system is configured to display a virtual input button of the wagering game via the display device, such that the virtual input button is displayed in a position proximate to a first haptic feedback device. Additionally, in response to the actuation of the virtual input button, the first haptic feedback device is activated and a game action associated with the virtual input button is performed.

According to another aspect of the invention, the virtual input button is repositioned in response to data received from a plurality of sensors. Further describing, a first sensor is associated with a first section of the bezel, a second sensor is associated with a second section of the bezel, and the virtual input button is repositioned from a position adjacent to the first section of the bezel to a position adjacent to the second section of the bezel. Both the first section of the bezel and second section of the bezel incorporate at least one haptic feedback device.

According to another aspect of the invention, a gaming system comprises a display device including a video display and a touchscreen, and a bezel adjacent to the display device including at least three discrete sections. At least two of the three discrete sections are associated with a respective sensor and a respective haptic feedback device. Additionally, the system comprises a processor and instructions stored in memory and executed by the processor, causing the gaming system to display a wagering game on the video display, and display a virtual input button on the video display at a position adjacent to a first of the three discrete sections of the bezel.

According to yet another aspect of the invention, computer readable storage media is encoded with instructions for directing a gaming system to perform the above methods.

Additional aspects of the invention will be apparent to those of ordinary skill in the art in view of the detailed description of various embodiments, which is made with reference to the drawings, a brief description of which is provided below.

Figure 1:
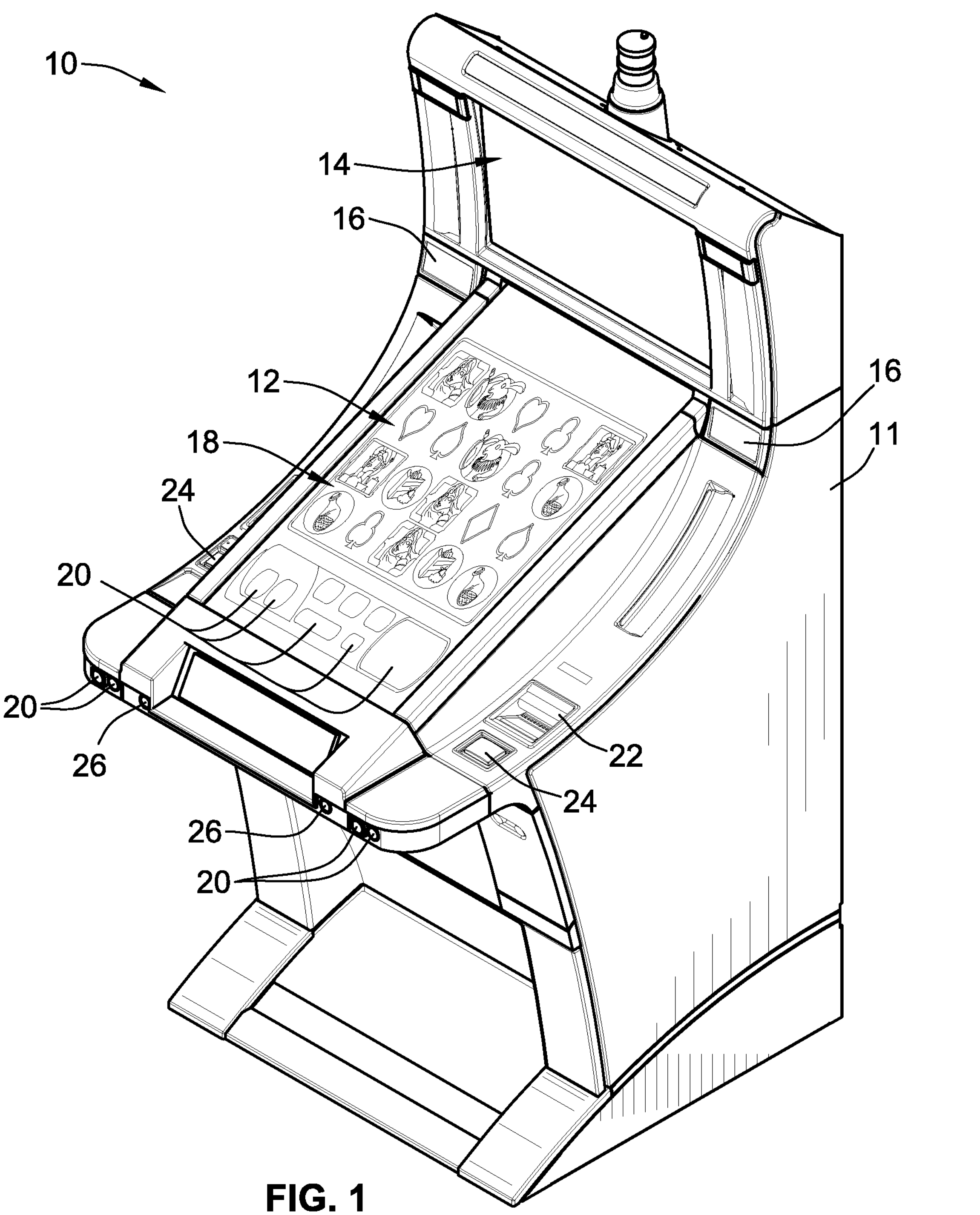
FIG. 1 is a perspective view of a free-standing gaming terminal according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words “and” and “or” shall be both conjunctive and disjunctive; the word “all” means “any and all”; the word “any” means “any and all”; and the word “including” means “including without limitation.”

Referring to FIG. 1, there is shown a gaming terminal 10 similar to those used in gaming establishments, such as casinos. With regard to the present invention, the gaming terminal 10 may be any type of gaming terminal and may have varying structures and methods of operation. For example, in some aspects, the gaming terminal 10 is an electromechanical gaming terminal configured to play mechanical slots, whereas in other aspects, the gaming terminal is an electronic gaming terminal configured to play a video casino game, such as slots, keno, poker, blackjack, roulette, craps, etc. The gaming terminal 10 may take any suitable form, such as floor-standing models as shown, handheld mobile units, bartop models, workstation-type console models, etc. Further, the gaming terminal 10 may be primarily dedicated for use in conducting wagering games, or may include non-dedicated devices, such as mobile phones, personal digital assistants, personal computers, etc. Exemplary types of gaming terminals are disclosed in U.S. Pat. No. 6,517,433 and Patent Application Publication Nos. US2010/0069160 and US2010/0234099, which are incorporated herein by reference in their entireties.

The gaming terminal 10 illustrated in FIG. 1 comprises a cabinet 11 that may house various input devices, output devices, and input/output devices. By way of example, the gaming terminal 10 includes a primary display area 12, a secondary display area 14, and one or more audio speakers 16. The primary display area 12 or the secondary display area 14 may be a mechanical-reel display, a video display, or a combination thereof in which a transmissive video display is disposed in front of the mechanical-reel display to portray a video image superimposed upon the mechanical-reel display. The display areas may variously display information associated with wagering games, non-wagering games, community games, progressives, advertisements, services, premium entertainment, text messaging, emails, alerts, announcements, broadcast information, subscription information, etc. appropriate to the particular mode(s) of operation of the gaming terminal 10. The gaming terminal 10 includes a touch screen(s) 18 mounted over the primary or secondary areas, buttons 20 on a button panel, bill validator 22, information reader/writer(s) 24, and player-accessible port(s) 26 (e.g., audio output jack for headphones, video headset jack, USB port, wireless transmitter/receiver, etc.). It should be understood that numerous other peripheral devices and other elements exist and are readily utilizable in any number of combinations to create various forms of a gaming terminal in accord with the present concepts.

Input devices, such as the touch screen 18, buttons 20, a mouse, a joystick, a gesture-sensing device, a voice-recognition device, and a virtual input device, accept player input(s) and transform the player input(s) to electronic data signals indicative of the player input(s), which correspond to an enabled feature for such input(s) at a time of activation (e.g., pressing a “Max Bet” button or soft key to indicate a player’s desire to place a maximum wager to play the wagering game). The input(s), once transformed into electronic data signals, are output to a CPU for processing. The electronic data signals are selected from a group consisting essentially of an electrical current, an electrical voltage, an electrical charge, an optical signal, an optical element, a magnetic signal, and a magnetic element.

Figure 2:
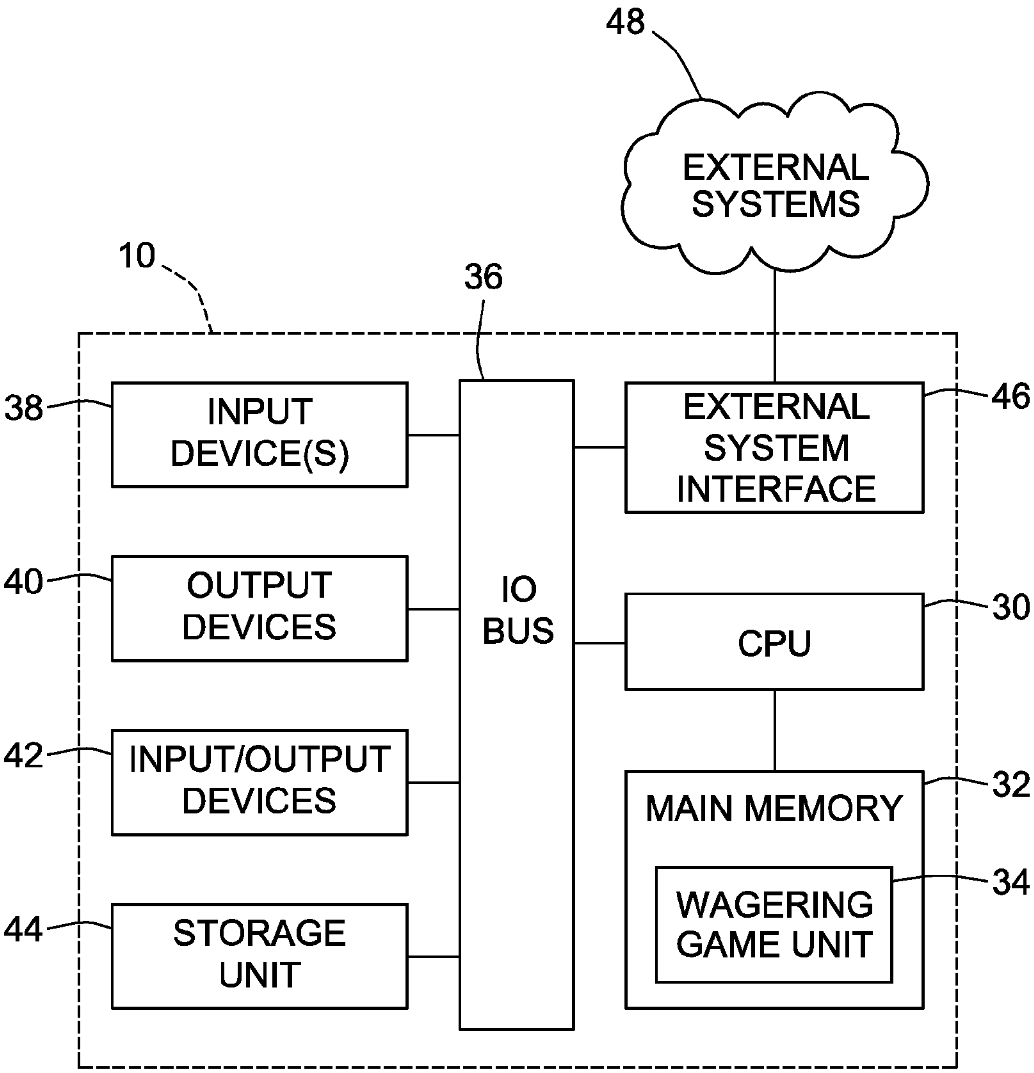
FIG. 2 (PRIOR ART)
FIG. 2 is a schematic view of a gaming system according to an embodiment of the present invention.

Turning now to FIG. 2, there is shown a block diagram of the gaming-terminal architecture. The gaming terminal 10 includes a central processing unit (CPU) 30 connected to a main memory 32. The CPU 30 may include any suitable processor(s), such as those made by Intel and AMD. By way of example, the CPU 30 includes a plurality of microprocessors including a master processor, a slave processor, and a secondary or parallel processor. CPU 30, as used herein, comprises any combination of hardware, software, or firmware disposed in or outside of the gaming terminal 10 that is configured to communicate with or control the transfer of data between the gaming terminal 10 and a bus, another computer, processor, device, service, or network. The CPU 30 comprises one or more controllers or processors and such one or more controllers or processors need not be disposed proximal to one another and may be located in different devices or in different locations. The CPU 30 is operable to execute all of the various gaming methods and other processes disclosed herein. The main memory 32 includes a wagering game unit 34. In one embodiment, the wagering game unit 34 may present wagering games, such as video poker, video black jack, video slots, video lottery, etc., in whole or part.

The CPU 30 is also connected to an input/output (I/O) bus 36, which can include any suitable bus technologies, such as an AGTL+frontside bus and a PCI backside bus. The I/O bus 36 is connected to various input devices 38, output devices 40, and input/output devices 42 such as those discussed above in connection with FIG. 1. The I/O bus 36 is also connected to storage unit 44 and external system interface 46, which is connected to external system(s) 48 (e.g., wagering game networks).

The external system 48 includes, in various aspects, a gaming network, other gaming terminals, a gaming server, a remote controller, communications hardware, or a variety of other interfaced systems or components, in any combination. In yet other aspects, the external system 48 may comprise a player’s portable electronic device (e.g., cellular phone, electronic wallet, etc.) and the external system interface 46 is configured to facilitate wireless communication and data transfer between the portable electronic device and the CPU 30, such as by a near-field communication path operating via magnetic-field induction or a frequency-hopping spread spectrum RF signals (e.g., Bluetooth, etc.).

The gaming terminal 10 optionally communicates with the external system 48 such that the terminal operates as a thin, thick, or intermediate client. In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets are contained within the gaming terminal 10 (“thick client” gaming terminal), the external system 48 (“thin client” gaming terminal), or are distributed therebetween in any suitable manner (“intermediate client” gaming terminal).

The gaming terminal 10 may include additional peripheral devices or more than one of each component shown in FIG. 2. Any component of the gaming terminal architecture may include hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic disk storage media, optical storage media, flash memory, etc.

Figure 3:
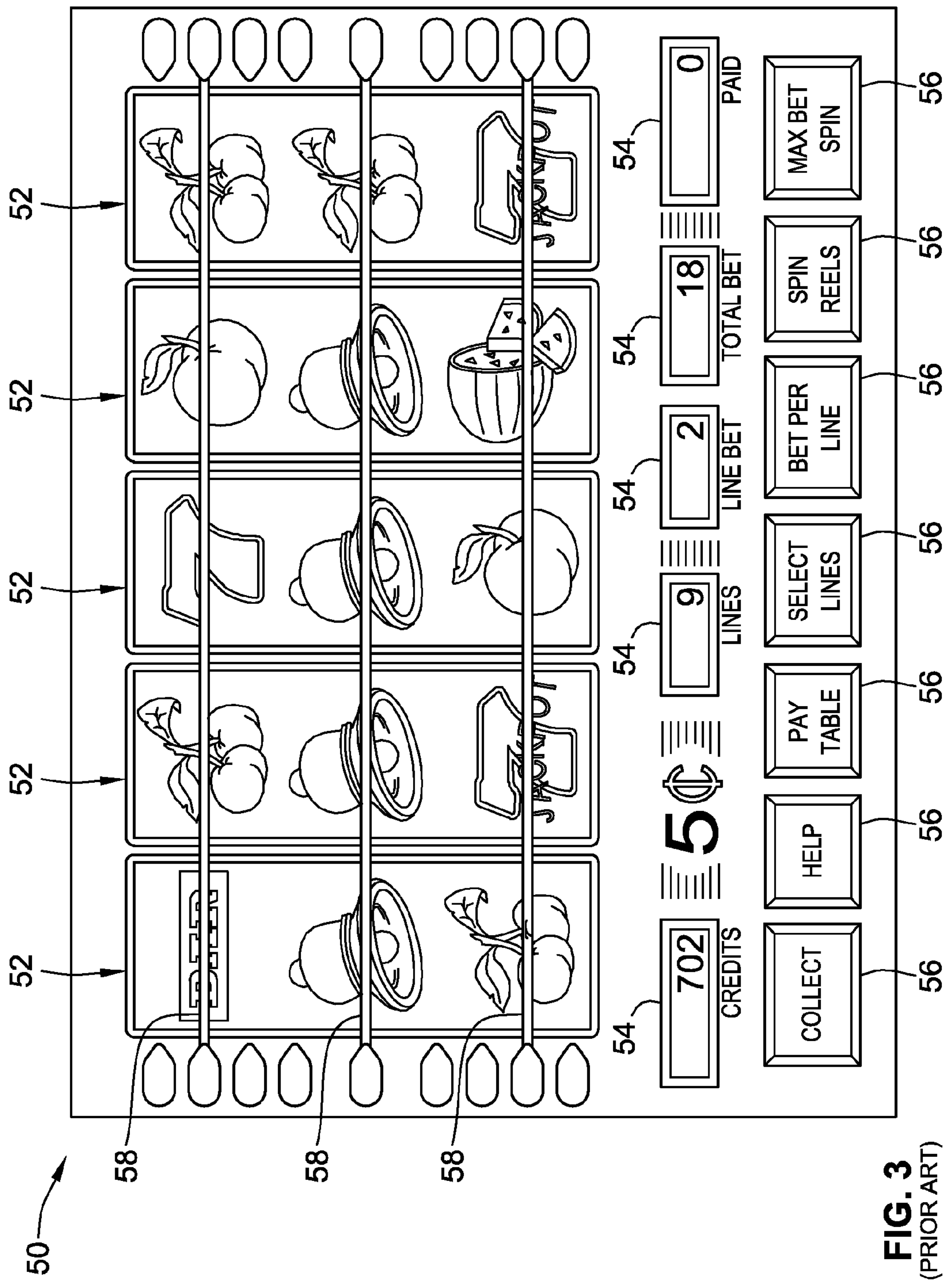
FIG. 3 (PRIOR ART)
FIG. 3 is an image of an exemplary basic-game screen of a wagering game displayed on a gaming terminal, according to an embodiment of the present invention.

Referring now to FIG. 3, there is illustrated an image of a basic-game screen 50 adapted to be displayed on the primary display area 12 or the secondary display area 14. The basic-game screen 50 portrays a plurality of simulated symbol-bearing reels 52. Alternatively or additionally, the basic-game screen 50 portrays a plurality of mechanical reels or other video or mechanical presentation consistent with the game format and theme. The basic-game screen 50 also advantageously displays one or more game-session credit meters 54 and various touch screen buttons 56 adapted to be actuated by a player. A player can operate or interact with the wagering game using these touch screen buttons or other input devices such as the buttons 20 shown in FIG. 1. The CPU operate(s) to execute a wagering game program causing the primary display area 12 or the secondary display area 14 to display the wagering game.

In response to receiving an input indicative of a wager, the reels 52 are rotated and stopped to place symbols on the reels in visual association with paylines such as paylines 58. The wagering game evaluates the displayed array of symbols on the stopped reels and provides immediate awards and bonus features in accordance with a pay table. The pay table may, for example, include "line pays" or "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Similarly, the wagering game may trigger bonus features based on one or more bonus triggering symbols appearing along an activated payline (i.e., "line trigger") or anywhere in the displayed array (i.e., "scatter trigger"). The wagering game may also provide mystery awards and features independent of the symbols appearing in the displayed array.

In accord with various methods of conducting a wagering game on a gaming system in accord with the present concepts, the wagering game includes a game sequence in which a player makes a wager and a wagering game outcome is provided or displayed in response to the wager being received or detected. The wagering game outcome is then revealed to the player in due course following initiation of the wagering game. The method comprises the acts of conducting the wagering game using a gaming apparatus, such as the gaming terminal 10 depicted in FIG. 1, following receipt of an input from the player to initiate the wagering game. The gaming terminal 10 then communicates the wagering game outcome to the player via one or more output devices (e.g., primary display 12 or secondary display 14) through the display of information such as, but not limited to, text, graphics, static images, moving images, etc., or any combination thereof. In accord with the method of conducting the wagering game, the CPU transforms a physical player input, such as a player's pressing of a "Spin Reels" touch key, into an electronic data signal indicative of an instruction relating to the wagering game (e.g., an electronic data signal bearing data on a wager amount).

In the aforementioned method, for each data signal, the CPU (e.g., CPU 30) is configured to process the electronic data signal, to interpret the data signal (e.g., data signals corresponding to a wager input), and to cause further actions associated with the interpretation of the signal in accord with computer instructions relating to such further actions executed by the controller. As one example, the CPU causes the recording of a digital representation of the wager in one or more storage media (e.g., storage unit 44), the CPU, in accord with associated computer instructions, causing the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM), etc. The noted second state of the data storage media comprises storage in the storage media of data representing the electronic data signal from the CPU (e.g., the wager in the present example). As another example, the CPU further, in accord with the execution of the instructions relating to the wagering game, causes the primary display 12, other display device, or other output device (e.g., speakers, lights, communication device, etc.) to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of computer instructions relating to the wagering game is further conducted in accord with a random outcome (e.g., determined by a RNG) that is used by the CPU to determine the outcome of the game sequence, using a game logic for determining the outcome based on the randomly generated number. In at least some aspects, the CPU is configured to determine an outcome of the game sequence at least partially in response to the random parameter.

Figure 4A:
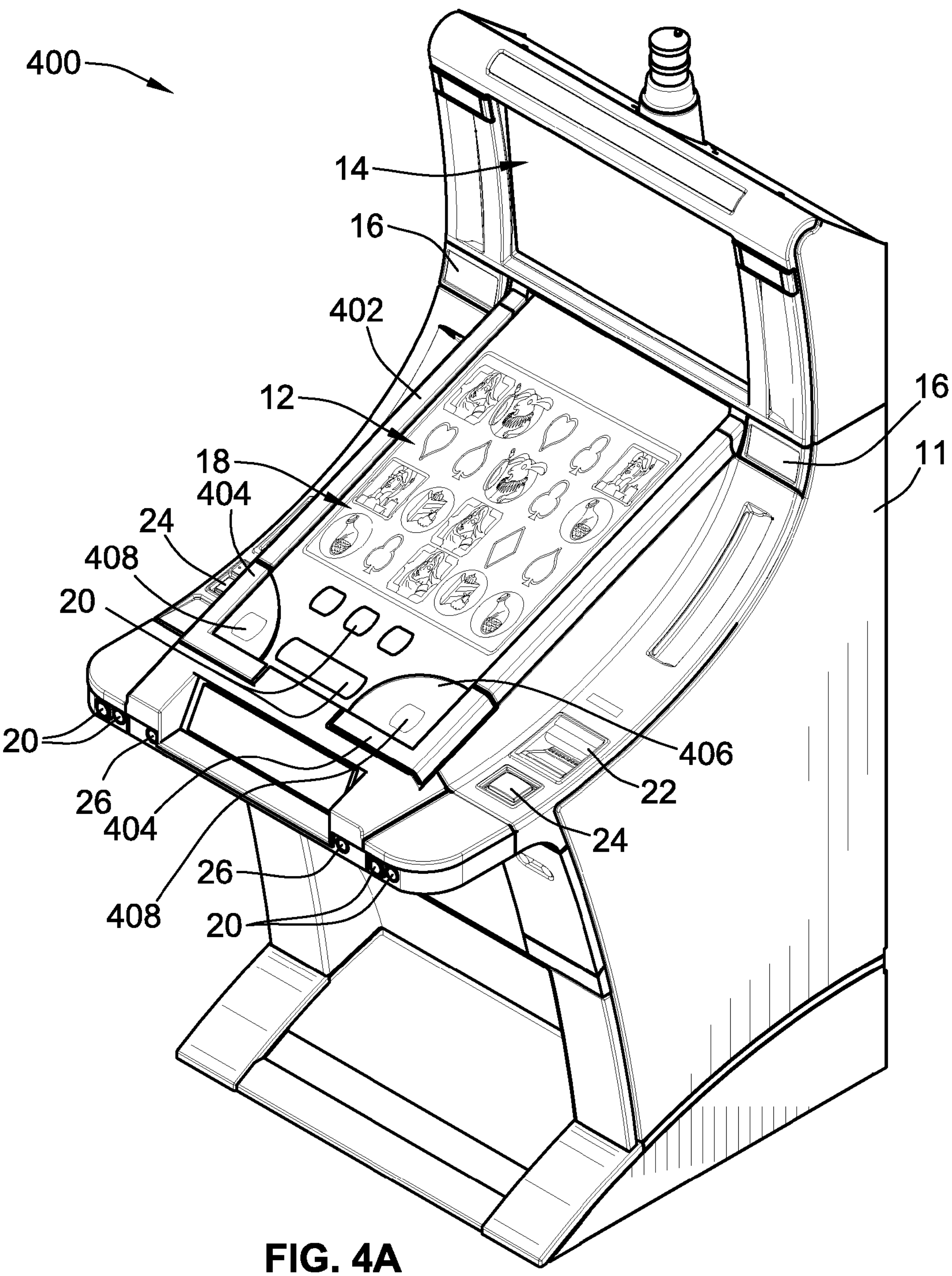
FIG. 4A is a perspective view of a free-standing gaming terminal including haptic feedback mechanisms according to an embodiment of the present invention.

Referring now to FIG. 4A, a gaming terminal 400 is illustrated. The gaming terminal 400 is similar to the gaming terminal 100 shown in FIG. 1, however, the gaming terminal 400 has been modified to include haptic feedback capability in areas adjacent to the primary display area 12 and the touchscreen 18. The gaming terminal 400 includes a bezel 402, and the bezel includes haptic feedback regions 404 capable of providing haptic feedback to a player. In some embodiments, such as the embodiment shown in FIG. 4A, the bezel 402 can be divided into discrete regions, such that haptic feedback may be experienced in one selected region, or multiple regions, of the bezel 402. Alternatively, the entire bezel 402 can be configured to receive haptic feedback.

The haptic feedback regions 404 of the bezel 402 can, optionally, be associated with transparent overlays 406. Each transparent overlay 406 is connected to a haptic feedback region 404 such that any haptic feedback, such as a vibration, occurring in the haptic feedback region 404 is also transferred to the associated transparent overlay 406. Additionally, the gaming terminal can be configured to display buttons 408 for selected gameplay actions so that the buttons 408 appear under the transparent overlays 406. Optimally, the transparent overlays 406 are positioned such that they are within one-half inch of the touchscreen 18; so that the touchscreen 18 can detect the activation of a button 408 via a transparent overlay 406 using known technologies discussed further below. Although the haptic feedback regions 404 are shown here next to the front corners of the primary display area 12, it is understood by one having ordinary skill in the art that the haptic feedback regions 404 can be positioned anywhere on the bezel 402. The bezel 402 corresponds to a frame or flange that at least partially extends around the display area 12.

Figure 4B:
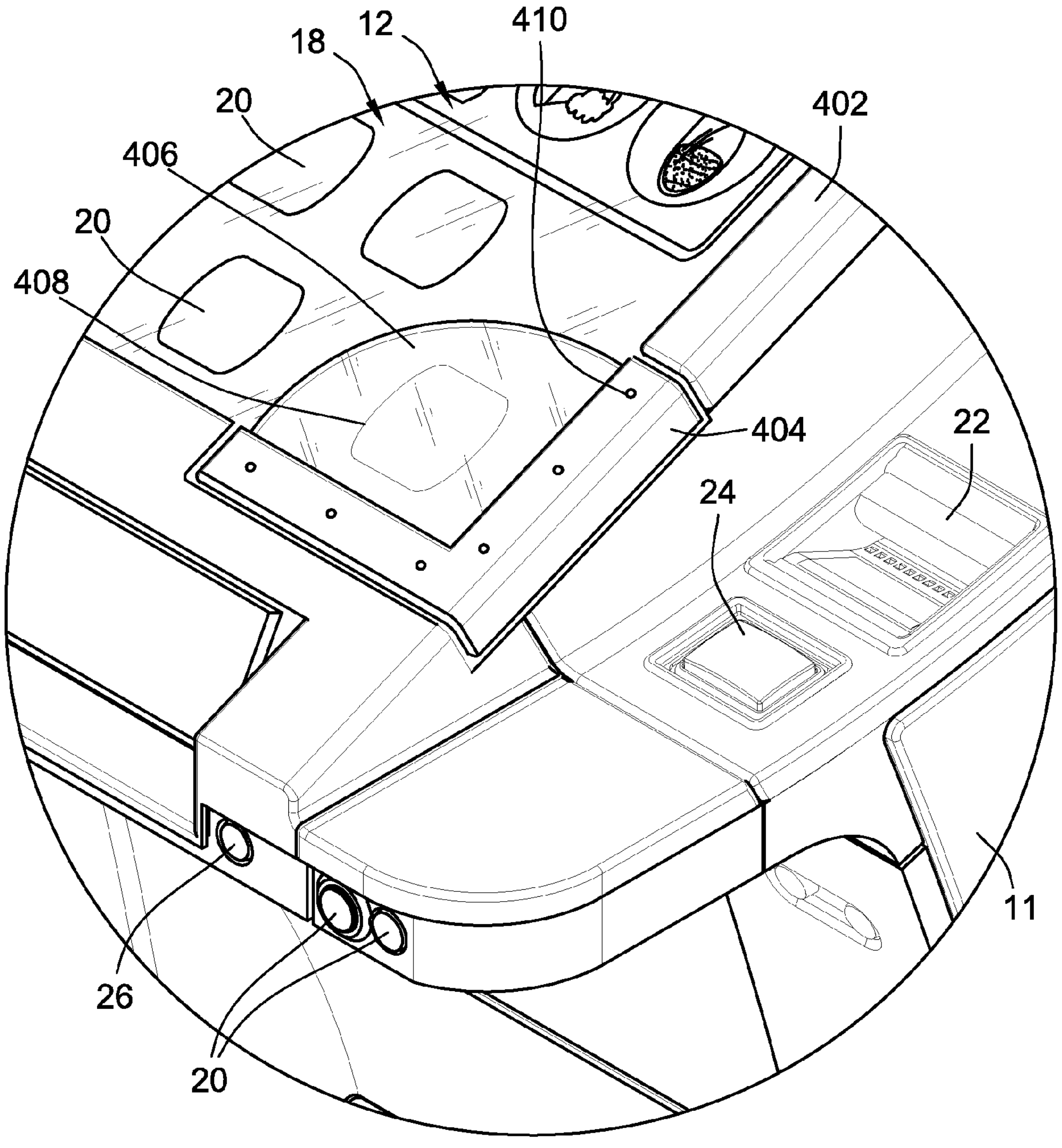
FIG. 4B is an enhanced view of a portion of FIG. 4A illustrating a haptic feedback mechanism according to an embodiment of the present invention.

Turning to FIG. 4B, there is shown a portion of the view of FIG. 4A, enlarged to show detail. Here, the haptic feedback region 404 shows sensors 410 incorporated therein. The sensors 410 are optionally included in the haptic feedback region 404 to allow for the detection of a player in contact with the haptic feedback region 404. Thus, the gaming terminal CPU 30 can use the information provided by sensors 410, if so desired, to provide haptic feedback only to selected haptic feedback regions 404. The sensors 410 may be any type of sensor able to detect the presence of a player's hand, arm, finger, etc. in the proximity of a haptic feedback region 404, including capacitive, electrostatic, pressure, optical, or other type of sensor 410. Although in this embodiment the sensors 410 are shown as part of the haptic feedback regions 404, the sensors 410 are not restricted to this location and may be positioned externally to the haptic feedback regions 404. For example, the sensors 410 may be a camera system positioned to provide a view of the haptic feedback regions 404. In the illustrated examples, the sensors 410 are optical sensors that sense the presence or absence of light through holes as shown in the haptic feedback region 404. Through use of sensors 410 to detect the position of a player's arm, hand, or fingers, gameplay including haptic feedback can continue while the player adjusts the positioning of the player's arm, hand, or fingers. This allows the player to select a position of optimum comfort, and reposition as needed, while continuing the gaming experience. This capability therefore allows for a longer and more comfortable gaming session.

Figure 4C:
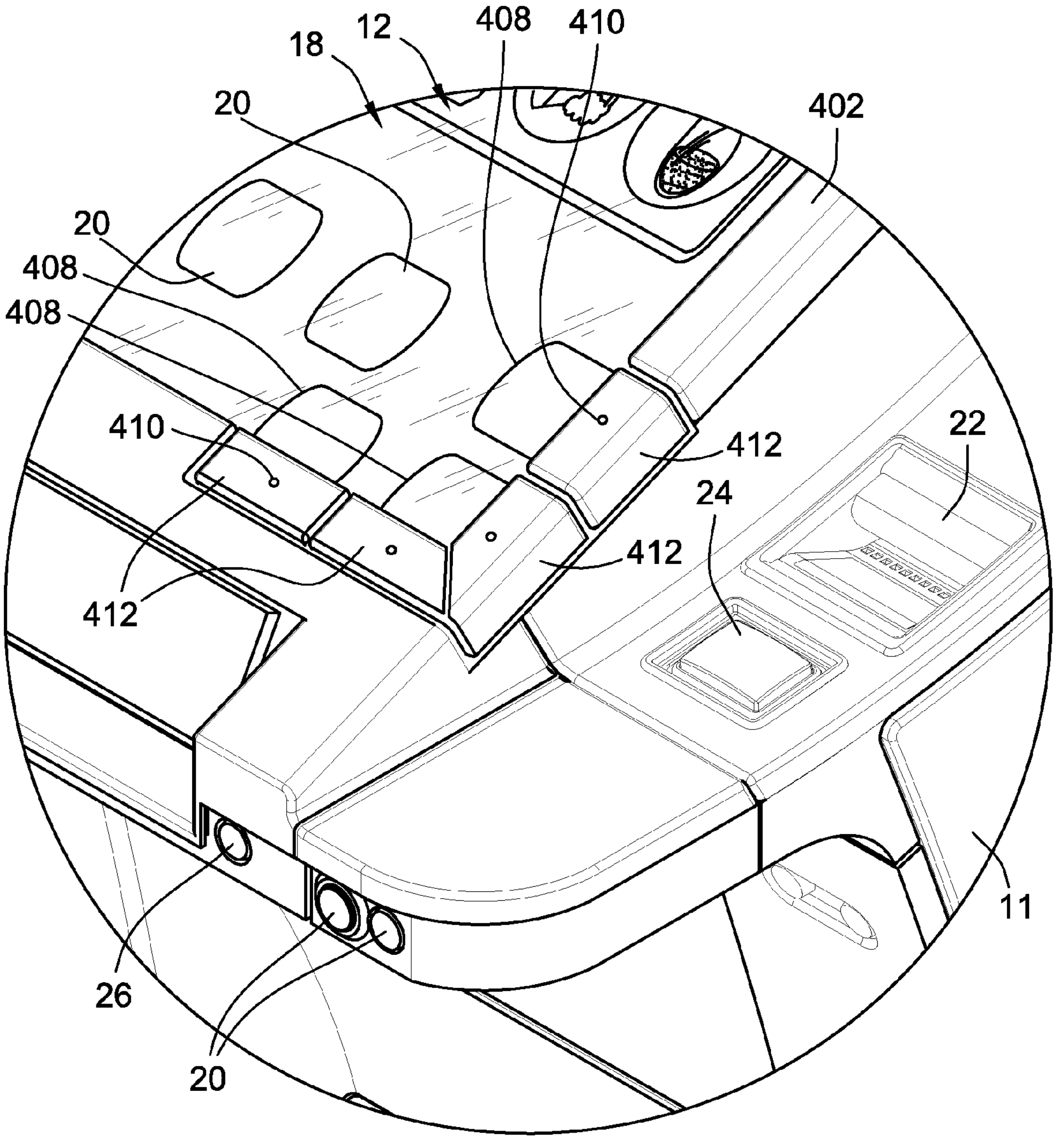
FIG. 4C is an enhanced view of a portion of FIG. 4A illustrating an alternative embodiment of a haptic feedback mechanism according to an embodiment of the present invention.

Turning to FIG. 4C, there is shown an alternative embodiment for providing haptic feedback. Here, the haptic feedback region (404 in FIG. 4B) has been subdivided into multiple haptic feedback sections 412. Each haptic feedback section 412 may optionally be associated with one or more sensors 410. Additionally, it is understood that some or all of the haptic feedback sections 412 may have a corresponding transparent overlay (not pictured here) for providing haptic feedback in the area directly over the touchscreen. The haptic feedback sections 412, if equipped with sensors 410, can be selectively activated by the CPU 30 to cause haptic feedback to occur based on the detection of a player's hand, finger, arm, etc. Additionally, buttons 408 can be positioned adjacent to the haptic feedback sections 412 so that a player is likely to come into contact with the haptic feedback section 412 when activating the button 408.

Figure 4D:
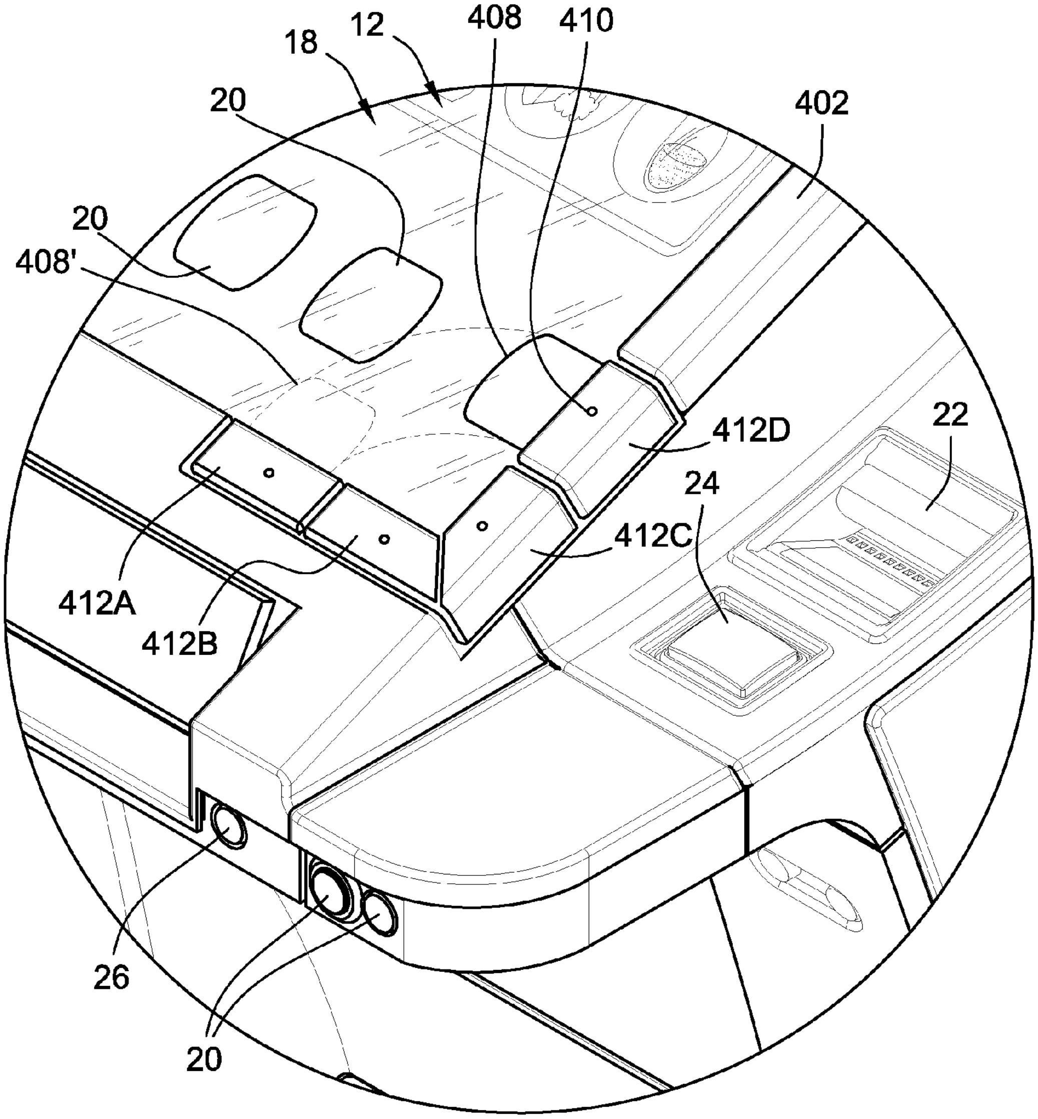
FIG. 4D is an enhanced view of a portion of FIG. 4A illustrating yet another embodiment of a haptic feedback mechanism according to an embodiment of the present invention.

An additional capability of the gaming terminal 400 is depicted in FIG. 4D. Based on the use of data from the sensors 410, the CPU 30 can configure the position of button(s) 408 according to a position of one or both of the player's hands. For example, a button 408 may be displayed adjacent to a haptic feedback section 412D. But, if input is received by the CPU 30 from the sensors 410 indicating that the player is in contact with haptic feedback section 412A, and not in contact with haptic feedback section 412D, then the CPU 30 can utilize this information to dynamically reposition the button 408 to position 408', where it is now adjacent to the haptic feedback section 412A. The CPU 30 will also correspondingly direct haptic feedback to haptic feedback section 412A in accordance with the data from the sensor 410. In a similar manner, a button 408 can be repeatedly repositioned in real time to be adjacent to the player's current hand position as detected by the sensors 410 in haptic feedback sections 412A-D, thus allowing a player to adjust to a more comfortable hand position as desired.

Furthermore, the CPU 30 can alternatively cause multiple haptic feedback sections 412A-D to be activated simultaneously or sequentially to create additional effects. For example, haptic feedback section 412A can be activated, followed by section 412B, followed by section 412C, followed by 412D, followed by 412A and so on to create a "haptic wave" effect.

Figure 5:
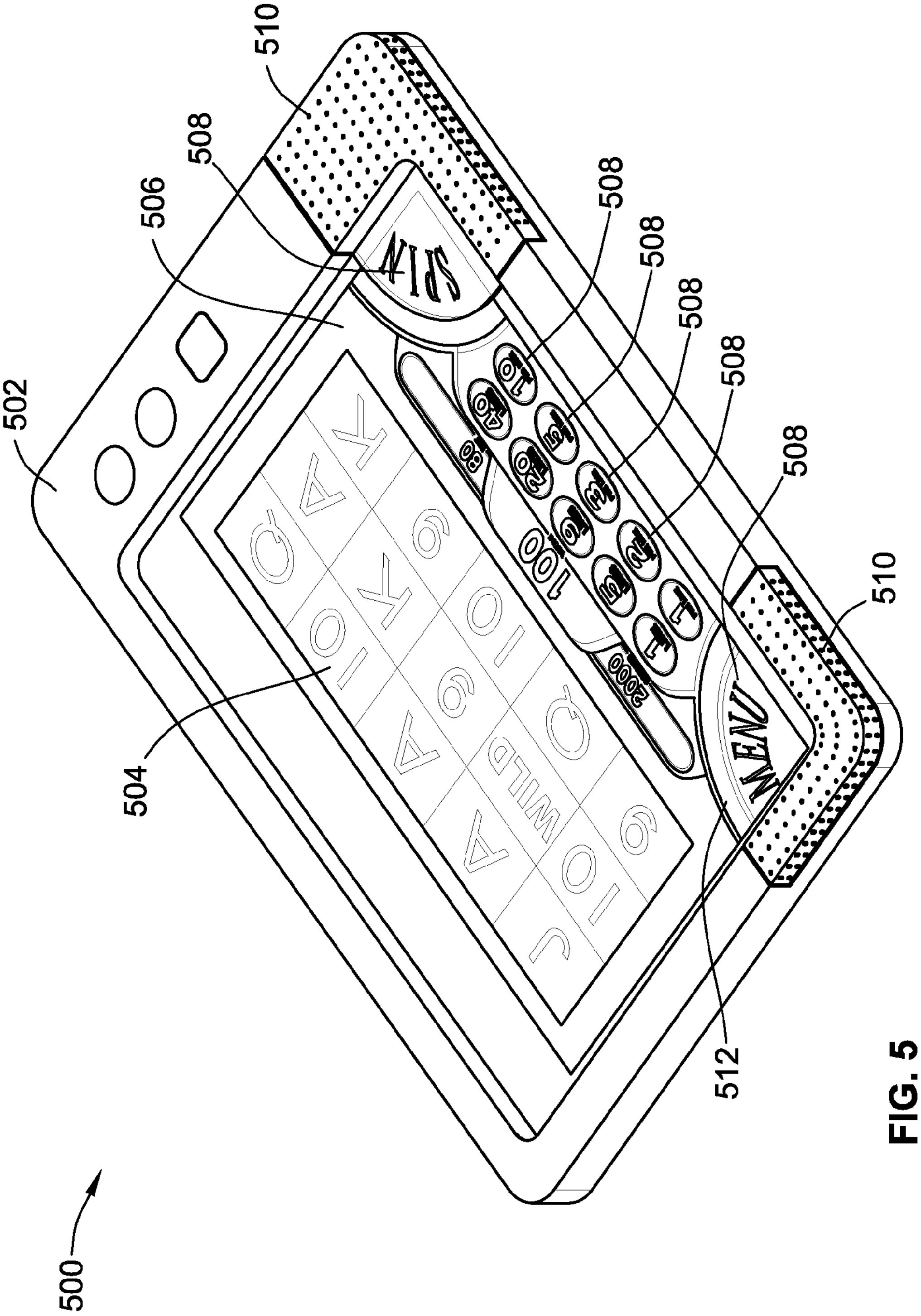
FIG. 5 is a perspective view of a hand-held gaming device including haptic feedback mechanisms according to an embodiment of the present invention

Referring now to FIG. 5, a hand-held gaming terminal 500 is illustrated. The gaming terminal 500 includes a casing 502 housing internal components, a display 504 for displaying a wagering game, a touchscreen 506 overlaying the display, and buttons 508 providing input to the gaming terminal 500. The gaming terminal has internal components (not pictured) that implement the gaming-terminal architecture depicted in FIG. 2. Additionally, the gaming terminal 500 includes haptic feedback regions 510 shown here positioned in the front corners of the casing 502, and adjacent to the display 504 and the touchscreen 506. The haptic feedback region 510 in the lower left corner is connected to a transparent overlay 512, so that the haptic feedback from the haptic feedback region 510 is transferred to the transparent overlay 512. Preferably, selected button(s) 508 are positioned such that they are seen under the transparent overlay 512, causing the player to press the transparent overlay 512 when activating the button 508.

It is understood that the positions of the haptic feedback regions 510 shown in FIG. 5 are an exemplary embodiment, and the number of haptic feedback regions as well as their relative position to the display is configurable. Additionally, the transparent overlay 512 is an optional feature that is not necessary to aspects of the present disclosure. If the transparent overlay 512 is used, the transparent overlay 512 is positioned so that an input, e.g. pressing a button 508 shown on the display 504, is detected by the touchscreen 506 when a player contacts the transparent overlay 512. Optimally, the touchscreen 506 and the transparent overlay 512 can be positioned such that the distance from the top surface of the touchscreen 506 to the top surface of the transparent overlay 512 is less than one-half inch. A touchscreen 506 with capacitive sensing capability can be used, such as touchscreens available from Zytronic Displays Ltd., www.zytronic.co.uk, to allow detection of a button 508 press through the transparent overlay 512. Other suitable touchscreens 506 will be apparent to one having ordinary skill in the art.

Figure 5A:
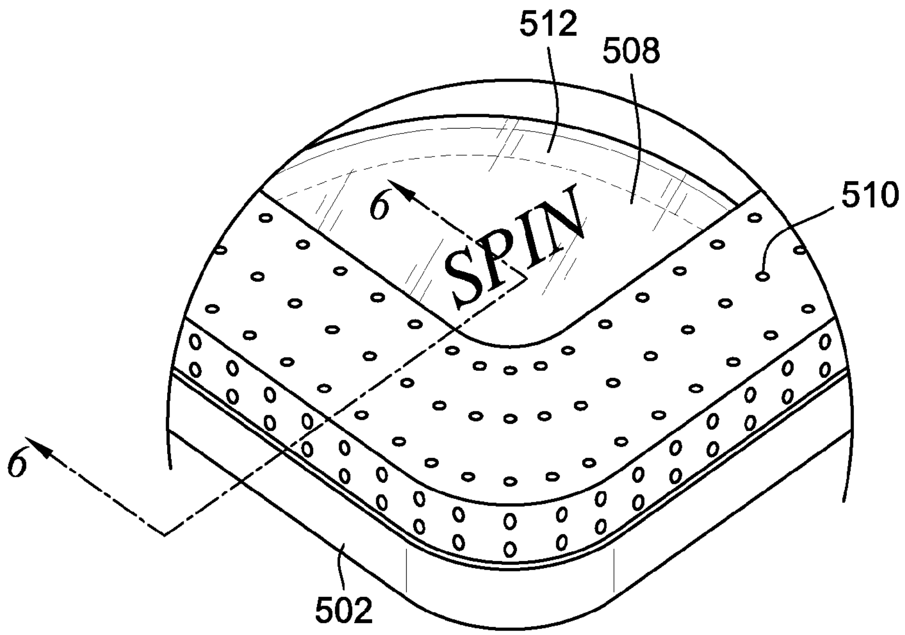
FIG. 5A is an enhanced view of a portion of FIG. 5, according to an embodiment of the present invention.

Turning to FIG. 5A, an enlarged view of a portion of the handheld gaming terminal 500 of FIG. 5 is shown. As is shown in FIG. 5A, the haptic feedback region 510 is positioned adjacent to button(s) 508 presented on the display. Here the button 508 is a "spin" button to cause reels displayed on the display 504 to spin, but alternatively, the button 508 can be any button for placing a wager, performing a game action, playing media content, cashing out winnings, or other actions as controlled by the CPU 30. There is a transparent overlay 512 covering the SPIN button 508 yet allowing for the button 508 to be readily visible to the player. The transparent overlay 512 is connected to the haptic feedback region 510 such that any haptic feedback experienced in the haptic feedback region 510 is also imparted on the transparent overlay 512. In some embodiments, when a player contacts the transparent overlay 512 to activate the button 508 positioned directly underneath the transparent overlay 512, the CPU 30 will cause the action associated with the button 508 to occur while simultaneously activating the haptic actuator(s) in contact with the haptic feedback region 510, causing the haptic feedback region 510 and the connected transparent overlay 512 to provide haptic feedback. (Haptic actuators are not visible here, but can be seen in cross section views shown in FIGS. 6A-6B, and it is understood in the present figure, as well as all other figures showing haptic feedback regions, that there is a mechanism for creating haptic feedback incorporated within each haptic feedback region.) Thus, the effect to a player is receiving a near-immediate haptic feedback effect through the transparent overlay 512 when activating the button 508. The transparent overlay 512 can be configured to form an arc having a radius slightly longer than an average human thumb.

Figure 5B:
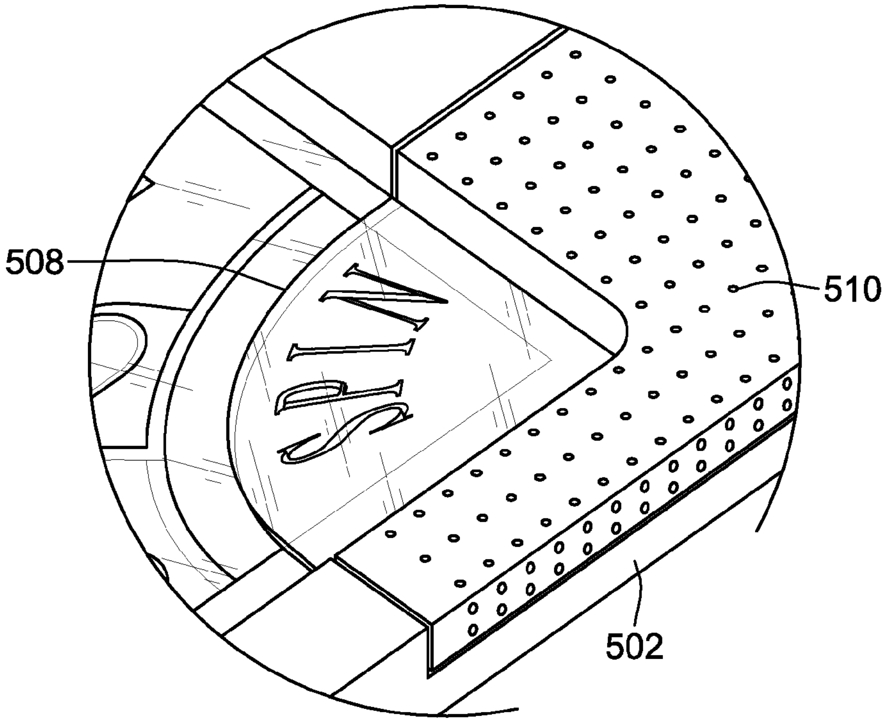
FIG. 5B is an enhanced view of another portion of FIG. 5, according to an embodiment of the present invention.

Turning now to FIG. 5B, there is shown an enhanced view of FIG. 5 showing the lower right corner of the handheld gaming terminal 500. The embodiment shown in FIG. 5B does not use the transparent overlay shown in the embodiment of FIG. 5A. Rather, only the haptic feedback region 510 imparts haptic feedback to a player. This haptic feedback may be associated with a certain game action or event, including, but not limited to, when a player selects a button 508 located near the haptic feedback region 510. Although FIG. 5B shows a "SPIN" button 508 positioned adjacent to the haptic feedback region 510, that is merely an exemplary embodiment. A variety of buttons 508 can be presented in a variety of positions, including the positioning of multiple buttons 508 to be adjacent to a portion of the haptic feedback region 510. Additionally, the haptic feedback region 510 may be provided without a corresponding button 508.

Figure 6A:
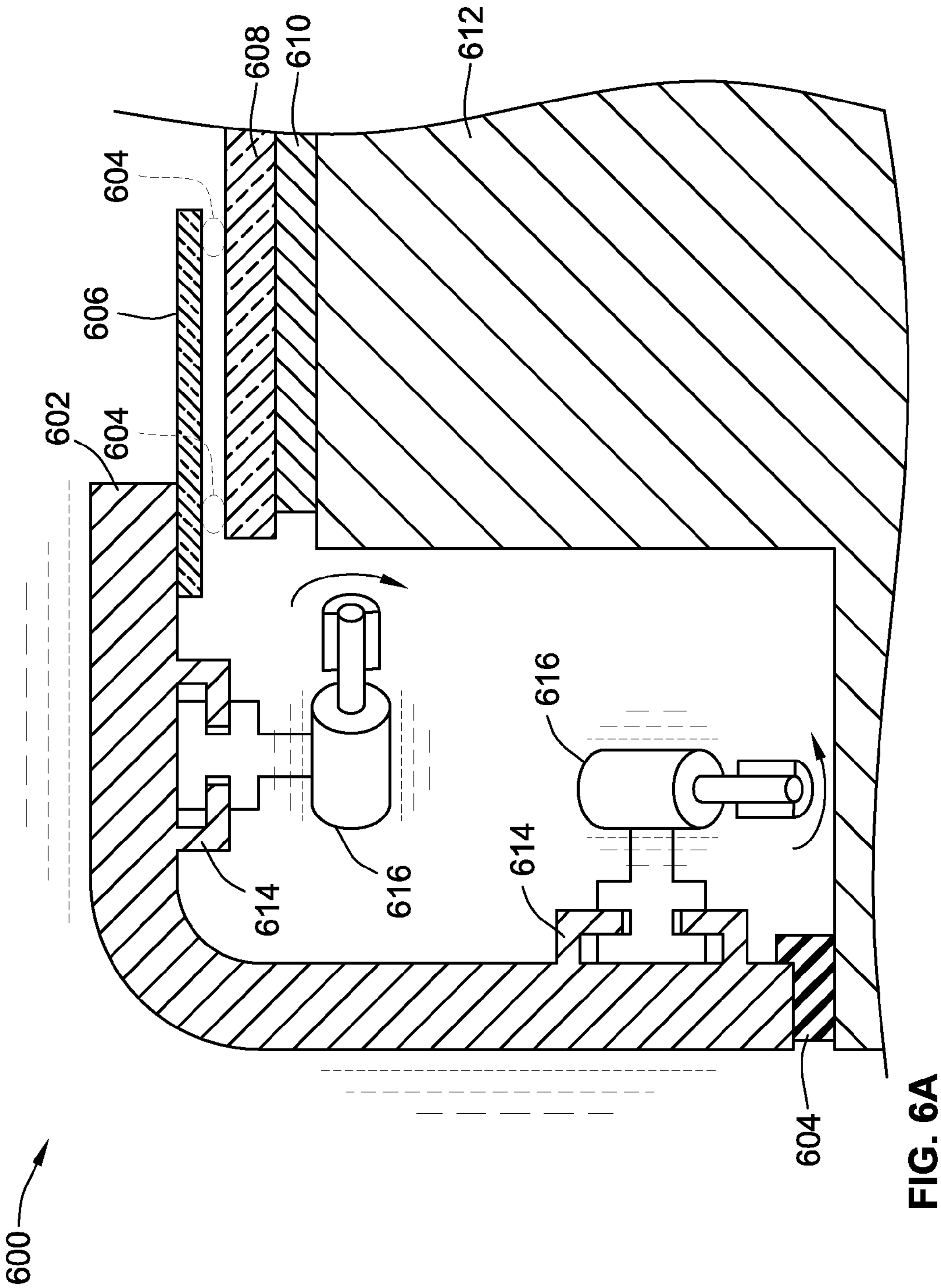
FIG. 6A is a cross-sectional view of a haptic feedback mechanism according to an embodiment of the present invention.

Shown in FIG. 6A is a cross section view of FIG. 5A, showing an exemplary embodiment for haptic feedback device(s) provided within the haptic feedback region 510 in FIG. 5A, in order to provide the haptic feedback capability to the haptic feedback region 510. In FIG. 6A the haptic feedback system 600 includes a bezel 602, which is connected to haptic feedback devices 616 via mounting points 614. Preferably, the haptic feedback devices 616 and mounting points 614 are positioned internally in relation to the bezel, such that they are not visible or accessible to a player using the gaming system.

A transparent overlay 606 is attached to the bezel 602. The transparent overlay 606 is positioned such that at least part of the transparent overlay overlaps the touchscreen 608, but the transparent overlay is optimally not in direct contact with the touchscreen 608. One or more spacers 604 maintain a small gap between the transparent overlay 606 and the touchscreen 608. Preferably, the spacers 604 are made out of a material capable of dampening vibration, such that any vibration experienced in the transparent overlay 606 is not transferred or minimally transferred to the touchscreen 608. Preferably, a spacer 604 is also used to join the opposite edge of the bezel 602 to the frame 612. The bezel 602 can be made of a high durometer thermoplastic elastomer, such as an elastomer having Shore A hardness on the AD durometer scale. Alternatively, the bezel 602 can be made from a more rigid material that is over-molded or covered by an elastomeric material. The spacer 604 must have an elastomeric, compliant, or semi-complaint quality to allow for movement of the bezel 602 in relation to the frame 612 and the touchscreen 608. The touchscreen 608 is positioned directly above the display 610. The display 610 is mounted to the frame 612.

One or more haptic feedback devices 616 will vibrate upon receiving a command from the CPU 30. In this embodiment shown in FIG. 6A, the vibration effect produced by each haptic feedback device 616 is created by rotating an unbalanced mass, commonly referred to as Eccentric Rotating Mass (ERM) actuators. However, as understood by a person having skill in the art, other types of haptic feedback devices 616 may be used, such as piezo actuators, linear resonant actuators, and other types. For example, the Texas Instruments DRV8601 (linear resonant actuator) or Texas Instruments DRV8662 (piezo actuator) can be used as the haptic feedback devices 616 in the system 600.

If two haptic feedback devices 616 are used, they can be positioned along perpendicular axes, so a first haptic feedback device 616 can impart haptic feedback to move the bezel 602 and connected transparent overlay 606 in an up and down motion, whereas the second haptic feedback device 616 can move the bezel 602 and overlay 606 in a side to side motion. This presents that capability for the system 600 to provide at least three different haptic feedback effects: vertical feedback when the first haptic feedback device 616 is activated, horizontal feedback when the second haptic feedback device 616 is activated, and a combined or diagonal effect when both haptic feedback devices 616 are activated. If desired, additional haptic feedback devices 616 can be added and adjusted positionally to achieve additional effects. Alternatively, the system 600 may use only one haptic feedback device 616 instead of two or more, provided there is at least one haptic feedback device 616 for each independent region of the bezel 602 where feedback is desired. Thus, in embodiments such as that shown in FIG. 4D with four discrete haptic feedback sections, at least four haptic feedback devices would be required.

Figure 6B:
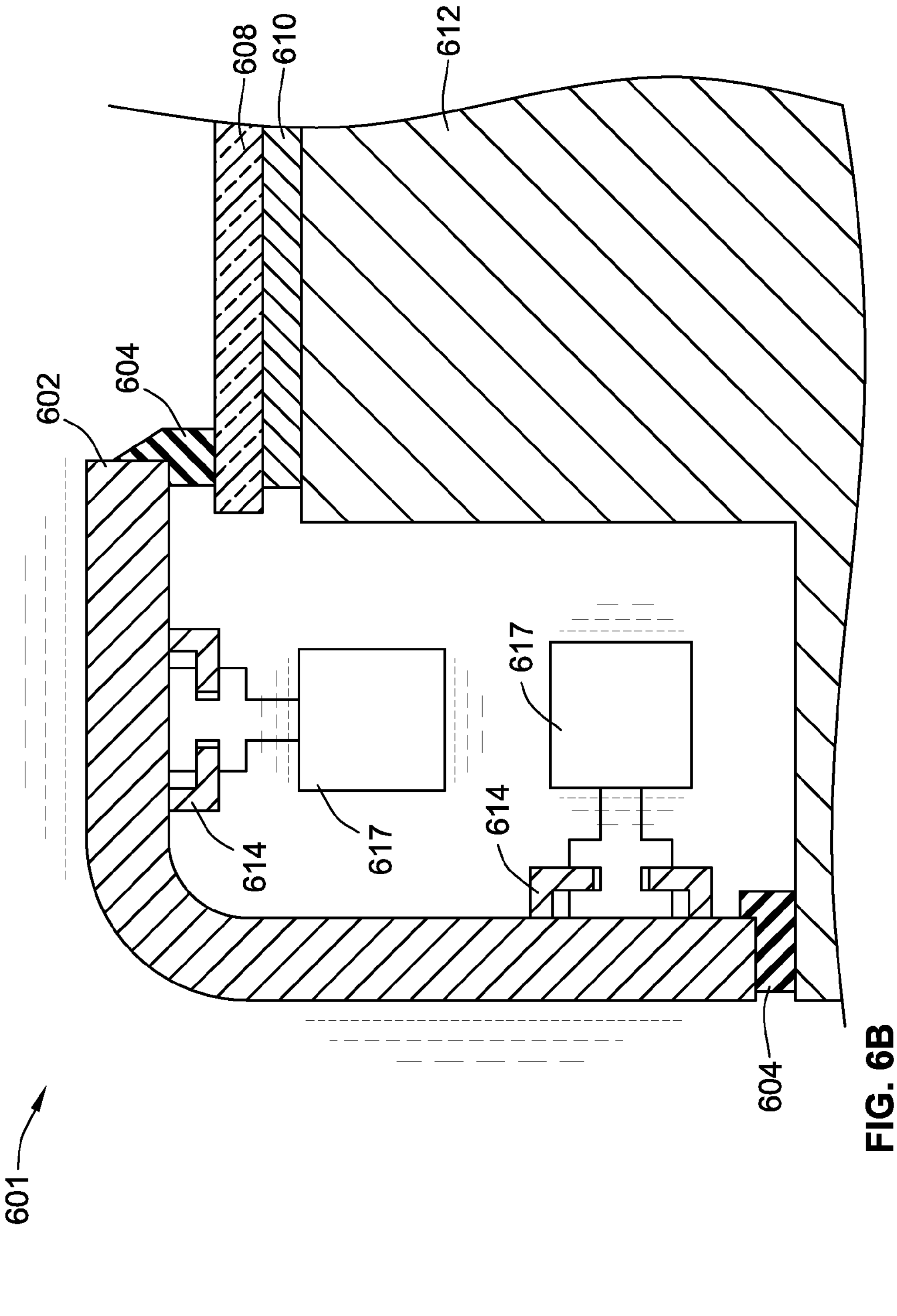
FIG. 6B is a cross-sectional view of an alternative embodiment of a haptic feedback mechanism according to an embodiment of the present invention.

Shown in FIG. 6B is a cross sectional view of an alternative embodiment. This embodiment does not use a transparent overlay and can correspond to, for example, the embodiment shown in FIG. 5B, or each individual haptic feedback section 412 shown in FIG. 4C.

In FIG. 6B the haptic feedback system 601 includes a bezel 602 connected to haptic feedback devices 617 via mounting points 614. Preferably, the haptic feedback devices 616 and the mounting points 614 are positioned internally in relation to the bezel, such that they are not visible or accessible to a player using the gaming system. A spacer 604 is used to receive one corner of the bezel 602 to the touchscreen 608, and another spacer 604 is used to join another corner of the bezel 602 to the frame 612. Preferably, the spacers 604 are a compliant or partially complaint polymer capable of dampening vibration, such that any vibration experienced in the bezel 602 is not transferred or minimally transferred to the touchscreen 608.

The touchscreen 608 is positioned directly above the display 610. The display 610 is mounted to the frame 612. The haptic feedback devices 617 pictured in FIG. 6B are shown to be piezo type actuators, however, any other type of actuator capable of providing haptic feedback can be used. If the haptic feedback devices 617 are used with a hand-held gaming embodiment, such as shown in FIG. 5, then the haptic feedback devices 617 can be battery powered. If the haptic feedback devices are used with a free standing gaming terminal, such as shown in FIG. 4A, then the haptic feedback devices 617 can be powered by an external source, e.g. power provided to the gaming terminal from a wall outlet or similar source.

As discussed in relation to FIG. 6A, the haptic feedback devices 617 in FIG. 6B can be positioned to provide haptic feedback on multiple axes. As is shown in FIG. 6B, this will cause the bezel 602 to vibrate in one or more associated directions, depending on whether a first haptic feedback device 617, a second haptic feedback device 617, or both are activated.

Figure 7:
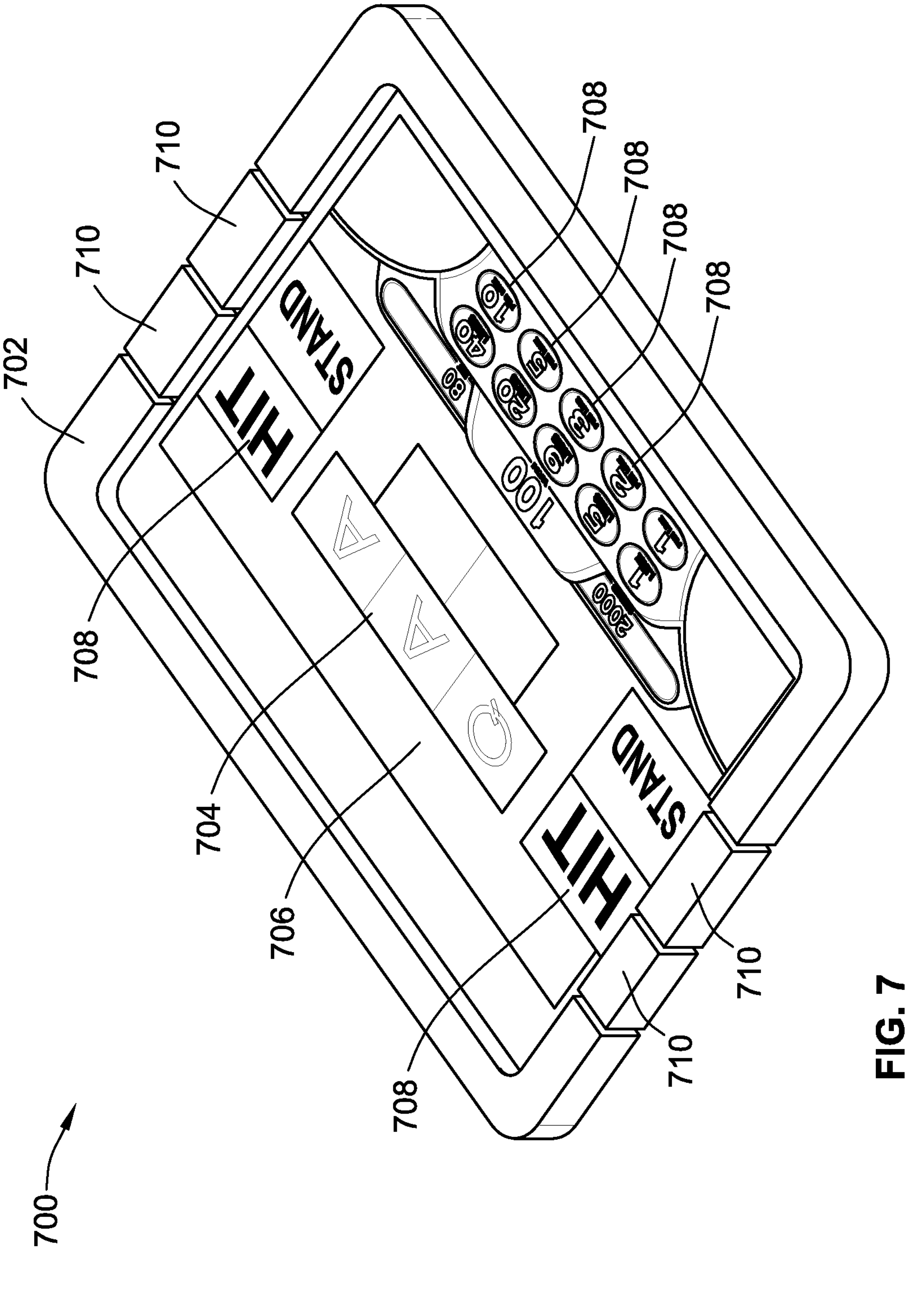
FIG. 7 is a perspective view of an alternative embodiment of a hand-held gaming device including haptic feedback mechanisms according to an embodiment of the present invention.

In FIG. 7, an alternative embodiment of the handheld gaming system of FIG. 5 is shown. As can be seen in FIG. 7, the hand-held gaming terminal 700 includes a casing 702 containing internal components, a display 704 for displaying a wagering game, a touchscreen 706 overlaying the display, and buttons 708 providing input to the gaming terminal 700. Additionally, the gaming terminal 700 includes haptic feedback regions 710 shown here positioned along the sides of the casing 702, in order to allow the player to easily hold the unit along the sides and experience haptic feedback. The haptic feedback regions 710 are positioned next to the display 704 and the touchscreen 706. Selected button(s) 708 displayed on the display 704 may be positioned such that they are near the haptic feedback areas 710, if it is desired to associate haptic feedback with particular button activation. Alternatively, the haptic feedback regions do not have to correspond with any buttons 708.

In one operating mode, the CPU 30 causes the system 700 to display a wagering game on the display 704. Subsequently, the CPU 30 performs an action associated with the wagering game and provides haptic feedback via a selected haptic feedback region 710 or multiple haptic feedback regions 710. The haptic feedback can be provided for specific or notable wagering game events, such as receiving a card, placing a wager, initiating a reel spin, stopping reels, or presenting a game outcome. The haptic feedback may be provided in association with an action by a player of the game, such as pressing a button 708, or the haptic feedback may be provided independently of any immediate player input.

Figure 8:
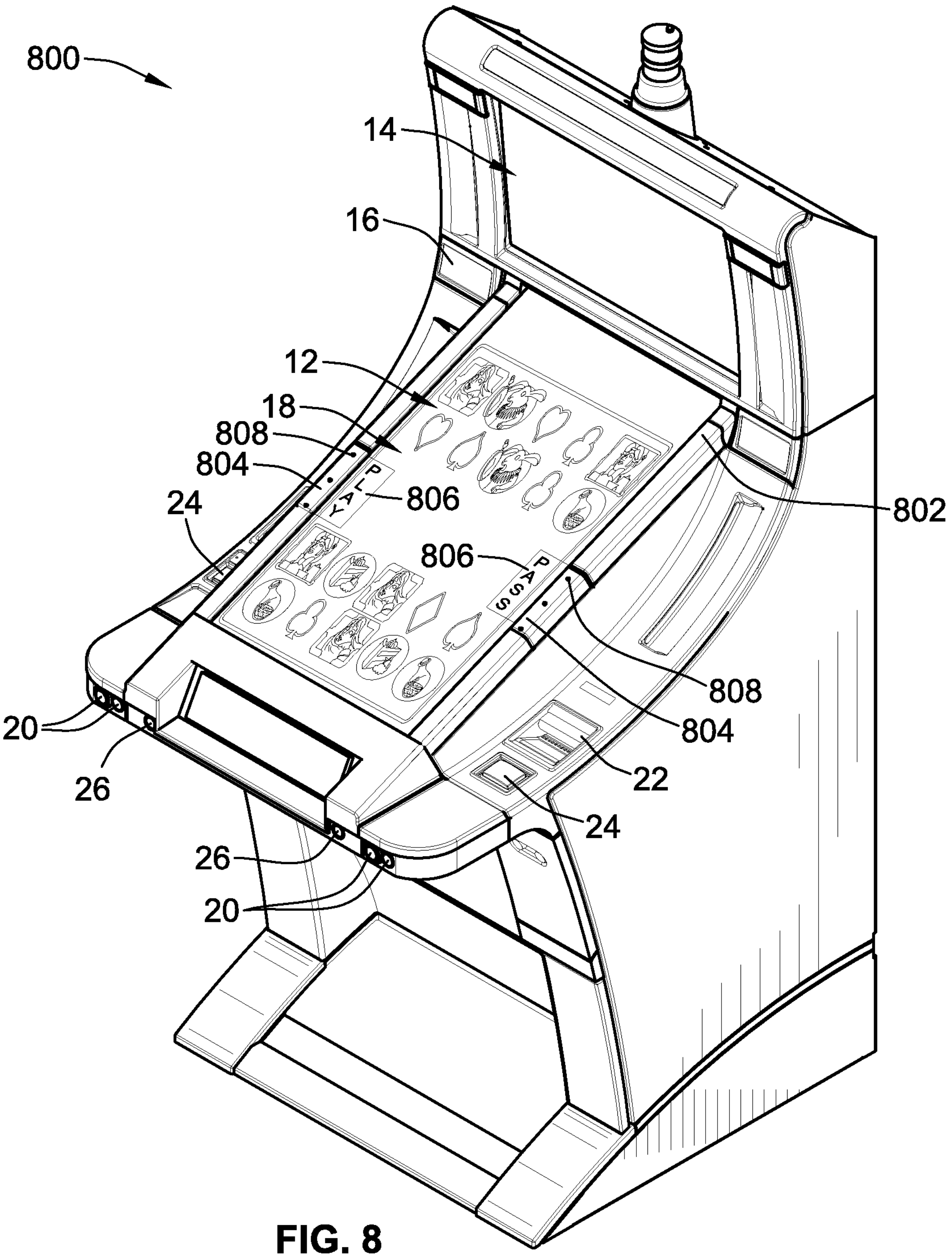
FIG. 8 is a perspective view of an alternative embodiment of a free-standing gaming terminal including haptic feedback mechanisms according to an embodiment of the present invention.

Turning to FIG. 8, an alternative embodiment is shown of a free-standing gaming terminal 800. Most of the components are the same as discussed previously in relation to FIG. 1 and FIG. 4A and will not be discussed further here. But as shown in FIG. 8, the gaming terminal 800 includes a bezel 802, and the bezel contains haptic feedback regions 804. The haptic feedback regions 804 are positioned adjacent to the sides of the display 12 and touchscreen 18, and capable of providing haptic feedback to a player. Additionally, buttons 806 are optionally positioned near the haptic feedback regions 804. This embodiment shows one alternative layout of the haptic feedback regions 804 in relation to the display 12, touchscreen 18, and buttons 806, but many alternative combinations are available including multiple haptic feedback regions 804 anywhere along the bezel 802, including the entire bezel if so desired. Additionally, the haptic feedback regions 804 may include sensors 808 for detecting when a player is in contact with a haptic feedback region 804.

Figure 9:
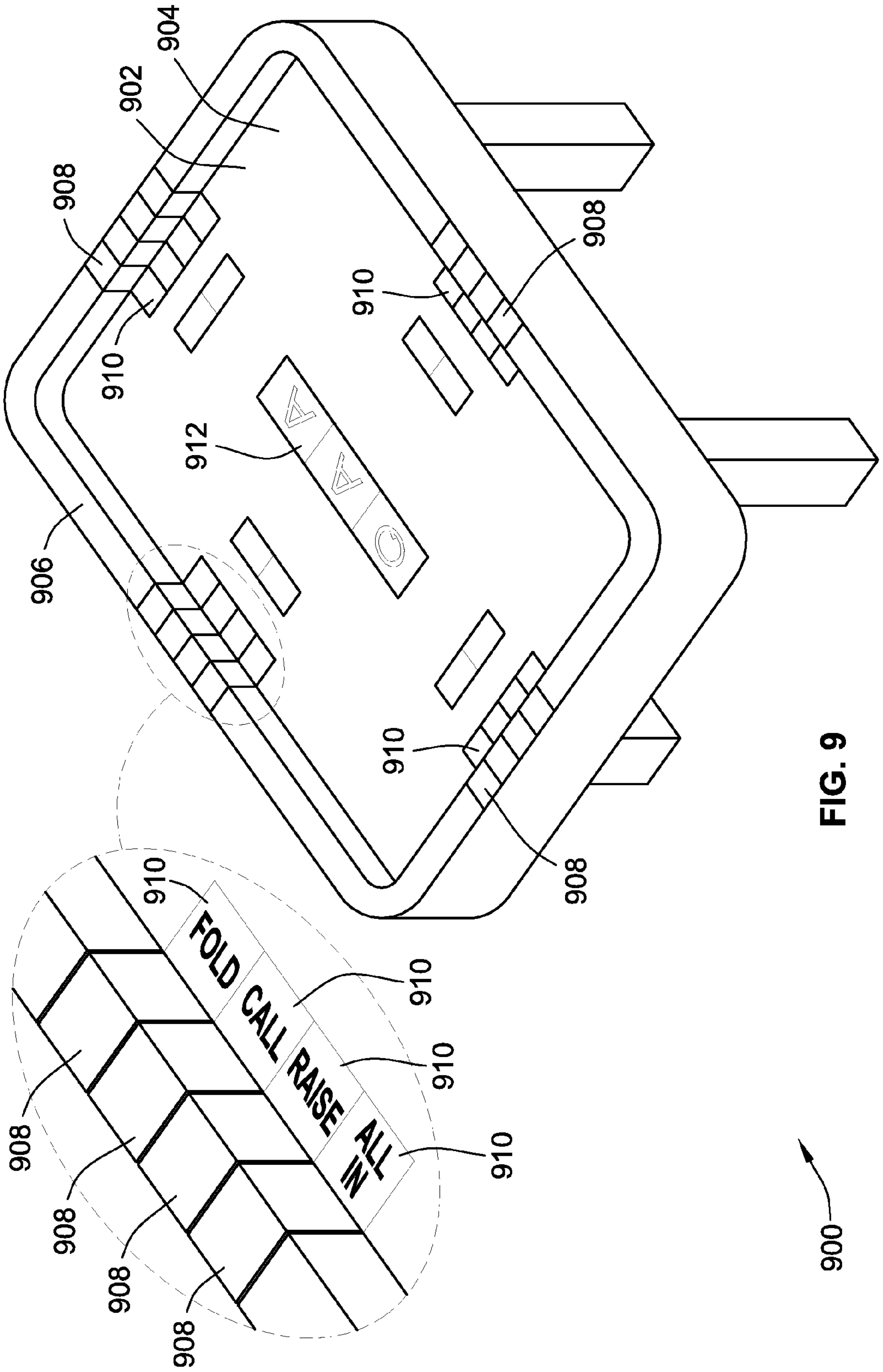
FIG. 9 is a perspective view of a free-standing gaming table including haptic feedback mechanisms according to an embodiment of the present invention.

Turning to FIG. 9, a gaming table 900 for playing a wagering game is shown. The gaming table 900 can accommodate multiple players. As shown in FIG. 9, the gaming table 900 can accommodate up to four players. Other gaming tables can be provided to accommodate additional players according to the concepts provided herein. The gaming table 900 has a large display 902 providing the surface of the table. A touchscreen 904 is positioned directly over the display. The display 902 and touchscreen 904 are joined to a frame or railing 906 running around the outside of the gaming table 900. A central region 912 of the gaming table 900 may be used to display items related to gameplay of the wagering game, e.g. cards, dice, reels, wheels, etc. The railing 906 includes haptic feedback regions 908 capable of providing targeted haptic feedback to a player resting a hand, arm, etc. on the railing 906. The haptic feedback regions 908 include a haptic feedback mechanism, such as shown in FIG. 6A or FIG. 6B, to provide haptic feedback to a section of the railing 906 and optionally to a transparent overlay (not shown here) connected to the railing section if desired. Player-selectable buttons 910 are displayed near the railing 906 such that a player is likely to be in contact with the railing 906 during normal game play. When a triggering event occurs during the wagering game, which may be in response the selection of a button 910 by the player, or a specific wagering game event, the CPU 30 will, in response to the triggering event, activate the haptic feedback region(s) 908 associated with the triggering event. If the triggering event is the activation of a button 910, the CPU 30 can activate the haptic feedback region 908 adjacent to the button 910. If the triggering event corresponds to a special event, the CPU 30 can activate all of the haptic feedback regions 908 at the position of the winning player. The haptic feedback regions 908 can be activated simultaneously, to produce a strong haptic feedback effect, or optionally the haptic feedback regions 908 can be activated in sequence, to create a "wave" effect for the player. Alternatively, the haptic feedback regions 908 can be activated in response to an input from sensors (not pictured here) detecting a player's hand, arm, etc. in contact with a haptic feedback region 908.

The functions described by way of example above represent one or more algorithms that correspond to at least some instructions executed by the CPU 30 in FIG. 2 to perform the above described functions associated with the disclosed concepts.

Each of these embodiments and obvious variations thereof is contemplated as falling within the spirit and scope of the claimed invention, which is set forth in the following claims. Moreover, the present concepts expressly include any and all combinations and subcombinations of the preceeding elements and aspects.

What is claimed is:

1. A gaming apparatus configured to conduct a wagering game comprising:

a fixed display device including a video display and a touchscreen associated therewith;

a bezel horizontally adjacent to the display device and incorporating one or more haptic feedback devices;

one or more processors; and one or more memory devices storing instructions that, when executed by at least one of the one or more processors, cause the gaming apparatus to:

display on the video display a wagering game; and activate at least one of the one or more haptic feedback devices to impart haptic feedback to the bezel without imparting haptic feedback to the display device, and perform a game action related to the wagering game.

2. The gaming apparatus of claim 1, wherein the at least one of the one or more haptic feedback devices is disposed in a corner of the bezel proximate to a player using the gaming apparatus, and the bezel is facing a same direction as the display device.

3. The gaming apparatus of claim 1, wherein the bezel includes a first pair of corners adjacent to a player using the gaming apparatus and a second pair of corners farther away from the player than the first pair of corners, a first haptic feedback device being disposed in one of the first pair of corners, the bezel including a second haptic feedback device disposed in the other of the first pair of corners.

4. The gaming apparatus of claim 1, wherein the bezel has an associated first surface area, wherein the at least one of the one or more haptic feedback devices, when actuated, provides haptic feedback to a discrete region of the bezel, wherein the discrete region of the bezel has an associated second surface area, and wherein the second surface area comprises less than 10% of the first surface area.

5. The gaming apparatus of claim 1, wherein a virtual input button of a wagering game is displayed on the video display at a position adjacent to a region of the bezel incorporating a first of the one or more haptic feedback devices, and, in response to actuation of the virtual input button via the touchscreen, activating the first haptic feedback device and performing the game action, wherein the game action is associated with the virtual input button.

6. The gaming apparatus of claim 5, wherein the region of the bezel incorporating the first of the one or more haptic feedback devices is configured to be in contact with a player when the player actuates the virtual input button.

7. The gaming apparatus of claim 5, wherein one or more virtual reels of the wagering game are displayed on the video display, the virtual input button is a spin button, and the game action associated with the virtual input button is a spin of at least one of the one or more virtual reels.

8. The gaming apparatus of claim 1, wherein the game action includes at least one of initiating play of the wagering game or accepting a wager to play the wagering game.

9. The gaming apparatus of claim 1, wherein the one or more haptic feedback devices is a plurality of haptic feedback devices, and wherein the bezel incorporates a plurality of sensors and the plurality of haptic feedback devices, each of the sensors being associated with a respective one of the one or more haptic feedback devices, and wherein the instructions cause the gaming apparatus to selectively activate the plurality of haptic feedback devices based on input received from the plurality of sensors.

10. The gaming apparatus of claim 9, wherein the gaming apparatus is a handheld device.

11. The gaming apparatus of claim 9, wherein a virtual input button of a wagering game is displayed on the video display at a position adjacent to a first region of the bezel incorporating a first of the one or more haptic feedback devices, wherein input from the plurality of sensors indicates a body in contact with a second region of the bezel, and wherein the gaming apparatus is configured to reposition the virtual input button from the position adjacent to the first region of the bezel to a position adjacent to the second region of the bezel.

12. The gaming apparatus of claim 1, wherein the display device is inclined at an angle of approximately 15 degrees relative to horizontal, the bezel includes a first pair of corners adjacent to a player using the gaming apparatus, the at least one of the one or more haptic feedback devices being disposed in one corner of the first pair of corners, and at least another one of the one or more haptic feedback devices being disposed in the other corner of the first pair of corners, the gaming apparatus being configured such that the player's hands rest on the first pair of corners at the player's option while the player is playing the wagering game.

13. The gaming apparatus of claim 1, further comprising a transparent overlay coupled to the bezel, the transparent overlay covering a portion of the display device, wherein the at least one of the one or more haptic feedback devices, when actuated, provides haptic feedback via the transparent overlay.

14. The gaming apparatus of claim 1, wherein the bezel is at least partially constructed from a high durometer thermoplastic elastomer.

15. The gaming apparatus of claim 1, wherein the one or more haptic feedback devices, when actuated, cause the bezel to vibrate, and wherein the display device is separated from the bezel such that, when the one or more haptic feedback devices are actuated, the display device does not vibrate.

16. The gaming apparatus of claim 1, wherein the display device has an area of at least 40 square inches.

17. A computer-implemented method of conducting wagering games on a wagering game system, the wagering game system including a fixed display device and a bezel horizontally adjacent to the display device incorporating one or more haptic feedback devices, the method comprising:

displaying, via the display device, a wagering game;

activating at least one of the one or more haptic feedback devices to impart haptic feedback to at least a portion of the bezel without imparting haptic feedback to the display device; and performing a game action related to the wagering game.

18. The method of claim 17 further comprising:

displaying, via the display device, a virtual input button of the wagering game, the virtual input button being displayed in a position proximate to a first haptic feedback device;

activating, in response to actuation of the virtual input button, the first haptic feedback device and performing a game action associated with the virtual input button.

19. The method of claim 18 further comprising:

repositioning the virtual input button, in response to data received from a plurality of sensors, a first sensor of the plurality of sensors associated with a first section of the bezel, a second sensor of the plurality of sensors associated with a second section of the bezel, such that the virtual input button is repositioned from a position adjacent to the first section of the bezel to a position adjacent to the second section of the bezel, the first section of the bezel incorporating at least one of the one or more haptic feedback devices, and the second section of the bezel incorporating at least one of the one or more haptic feedback devices.

20. A gaming apparatus configured to conduct a wagering game comprising:

a fixed display device including a video display and a touchscreen associated therewith;

a bezel horizontally adjacent to the display device including at least three discrete sections, wherein at least two of the at least three discrete sections are associated with a respective sensor and a respective haptic feedback device;

one or more processors; and one or more memory devices storing instructions that, when executed by at least one of the one or more processors, cause the gaming apparatus to:

display on the video display a wagering game;

display on the video display a virtual input button of a wagering game at a position adjacent to a first of the at least three discrete sections;

responsive to activation of the virtual input button via the touchscreen combined with activation of the respective sensor associated with the first of the at least three discrete sections, activate the respective haptic feedback device associated with the first discrete section to impart haptic feedback to the first discrete section without imparting haptic feedback to the display device, and perform a game action related to the wagering game.

* * * * *